(12) United States Patent
Fan et al.

(10) Patent No.: US 9,526,102 B2
(45) Date of Patent: Dec. 20, 2016

(54) METHOD AND APPARATUS FOR ASSIGNING SLOT

(71) Applicant: FUJITSU LIMITED, Kawasaki-shi, Kanagawa (JP)

(72) Inventors: Xiaojing Fan, Beijing (CN); Hao Wang, Beijing (CN); Yi Xu, Beijing (CN); Longteng Yi, Beijing (CN); Jun Tian, Beijing (CN); Taiji Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 14/481,711

(22) Filed: Sep. 9, 2014

(65) Prior Publication Data

US 2015/0071158 A1 Mar. 12, 2015

(30) Foreign Application Priority Data

Sep. 10, 2013 (CN) .......................... 2013 1 0409883

(51) Int. Cl.
*H04W 4/00* (2009.01)
*H04B 7/00* (2006.01)
(Continued)

(52) U.S. Cl.
CPC ........ *H04W 72/0446* (2013.01); *H04L 45/026* (2013.01); *H04W 4/06* (2013.01); *H04W 74/04* (2013.01)

(58) Field of Classification Search
CPC ... H04L 45/026; H04W 4/06; H04W 72/0446; H04W 74/04
(Continued)

(56) References Cited

U.S. PATENT DOCUMENTS 7,206,319 B2 * 4/2007 Li .......................... H04L 12/413
370/448
2003/0099221 A1 * 5/2003 Rhee ...................... H04L 12/12
370/338
(Continued)

FOREIGN PATENT DOCUMENTS

| CN | 101272178 A | 9/2008 |
|---|---|---|
| CN | 202135151 U | 2/2012 |
| CN | 102857327 A | 1/2013 |

OTHER PUBLICATIONS

Lee, Myung, et al., "Required Changes for EGTS Extension," Wireless Personal Area Networks, IEEE P802.15, IEEE-15-09-0377-01-0004e, Aug. 12, 2014, pp. 1-65.

*Primary Examiner* — Khaled Kassim
*Assistant Examiner* — Berhanu Belete
(74) *Attorney, Agent, or Firm* — Arent Fox LLP

(57) ABSTRACT

Embodiments of the present invention provide a method and apparatus for assigning slot. The method includes: constructing an HELLO packet, the HELLO packet including GTS request information of a local node or including GTS request information of the local node and GTS request information of at least one neighboring node within a collision domain of the local node; and broadcasting the HELLO packet, so that a node receiving the HELLO packet performs slot reservation according to information contained in the HELLO packet. With the method and apparatus for assigning slot provided by the embodiments of the present invention, no central controller is needed any longer in comparison with a centralized slot assignment method, complexity of calculation is lowered, and utilization of slot is improved.

19 Claims, 12 Drawing Sheets

701 calculating the traffic of the local node

702 calculating the period of the requested GTS according to the traffic within the collision domain of the a sink node and the calculated traffic of the local node

(51) Int. Cl.
  *H04W 72/04*   (2009.01)
  *H04L 12/751*  (2013.01)
  *H04W 4/06*    (2009.01)
  *H04W 74/04*   (2009.01)

(58) Field of Classification Search
  USPC .................................................. 370/312
  See application file for complete search history.

(56) References Cited

U.S. PATENT DOCUMENTS

| | | | | |
|---|---|---|---|---|
| 2003/0169697 A1* | 9/2003 | Suzuki | ................... | H04L 47/14 370/310 |
| 2004/0032847 A1* | 2/2004 | Cain | ................... | H04B 7/2643 370/338 |
| 2004/0072573 A1* | 4/2004 | Shvodian | .......... | H04L 29/12009 455/450 |
| 2004/0228304 A1* | 11/2004 | Riedel | ................... | H04W 36/26 370/332 |
| 2006/0198346 A1* | 9/2006 | Liu | ...................... | H04W 40/24 370/338 |
| 2008/0253327 A1* | 10/2008 | Kohvakka | ............ | H04W 16/14 370/330 |
| 2009/0161637 A1* | 6/2009 | Ruy | ..................... | H04W 72/02 370/336 |
| 2009/0168670 A1* | 7/2009 | Yang | ...................... | H04L 67/12 370/254 |
| 2009/0207747 A1* | 8/2009 | Kim | ................... | H04L 43/0811 370/252 |
| 2009/0257410 A1* | 10/2009 | Liu | ...................... | H04W 28/06 370/336 |
| 2009/0274127 A1* | 11/2009 | Jeong | ..................... | H04L 45/04 370/336 |
| 2010/0034159 A1* | 2/2010 | Shin | .................. | H04W 72/1257 370/329 |
| 2011/0007669 A1* | 1/2011 | Yoon | .................... | H04L 45/026 370/255 |
| 2011/0038343 A1* | 2/2011 | Bhatti | .................. | H04W 28/06 370/330 |
| 2011/0044169 A1* | 2/2011 | Liu | ..................... | H04L 45/026 370/235 |
| 2011/0158204 A1* | 6/2011 | Shin | .................. | H04W 52/0216 370/336 |
| 2012/0059936 A1* | 3/2012 | Bauchot | ........... | H04W 56/0015 709/226 |
| 2012/0163279 A1* | 6/2012 | Tran | ....................... | H04Q 9/00 370/312 |
| 2012/0236875 A1* | 9/2012 | Vijayasankar | ........... | H04B 3/54 370/458 |
| 2012/0250664 A1* | 10/2012 | Li | ...................... | H04W 28/044 370/338 |
| 2013/0070734 A1* | 3/2013 | Hwang | ............... | H04W 74/002 370/336 |
| 2013/0094481 A1* | 4/2013 | Jeong | ................ | H04W 72/0446 370/336 |
| 2014/0247817 A1* | 9/2014 | Lim | .................. | H04W 52/0216 370/336 |
| 2015/0049644 A1* | 2/2015 | Lee | ................... | H04W 72/0446 370/256 |

* cited by examiner constructing an HELLO packet, the HELLO packet including GTS request information of a local node or including GTS request information of a local node and GTS request information of at least one neighboring node within a collision domain of the local node

301 broadcasting the HELLO packet, so that a node receiving the HELLO packet performs slot reservation according to information contained in the HELLO packet

| Tx$_1$ | Rx$_1$ | exp$_1$ | offset$_1$ | T$_1$ | distance$_1$ | comment$_1$ |
|---|---|---|---|---|---|---|
| Tx$_2$ | Rx$_2$ | exp$_2$ | offset$_2$ | T$_2$ | distance$_2$ | comment$_2$ |
| Tx$_3$ | Rx$_3$ | exp$_3$ | offset$_3$ | T$_3$ | distance$_3$ | comment$_3$ |
| Tx$_4$ | Rx$_4$ | exp$_4$ | offset$_4$ | T$_4$ | distance$_4$ | comment$_4$ |

METHOD AND APPARATUS FOR ASSIGNING SLOT

CROSS-REFERENCE TO RELATED APPLICATIONS

This application is based upon and claims the benefit of priority to Chinese Patent Application No. 201310409883.7, filed Sep. 10, 2013. The disclosure of the prior application of which is hereby incorporated in its entirety by reference.

TECHNICAL FIELD

The present invention relates to the fields of wireless communications, and in particular to a method and apparatus for assigning slot.

BACKGROUND ART

Many applications of sensor networks involve periodically collecting data generated by sensor nodes at the sink node. The periodical data collection on tree topology is a basic operation in a wireless sensor network. Such kind of many to one communication pattern is also defined as convergecast. In some applications, 100% packet delivery ratio is required for convergecast. Given single channel frequency, superframe specified in IEEE 802.15.4 provides GTS (guaranteed time slot) for contention free transmission. However, a method for assigning slot is not provided by IEEE 802.15.4, and especially the slot assignment in tree topology is a challenge.

Currently, most of the slot assignment methods for convergecast are centralized. In the centralized method, a central controller is required, and positions of all other nodes are also required. If the number of nodes is large, the centralized method will be invalid.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

A main object of embodiments of the present invention is to provide a method and apparatus for assigning slot, so as to solve problems existed in a centralized slot assignment method.

According to a first aspect of the embodiments of the present invention, there is provided a node, including:

a first constructing unit configured to construct a GTS binary tree;

a storing unit configured to store the GTS binary tree constructed by the first constructing unit and pre-store GTS request information of all neighboring nodes within a collision domain of a local node and reservation history information of the local node;

a second constructing unit configured to construct an HELLO packet, the HELLO packet including GTS request information of the local node or including GTS request information of the local node and GTS request information of at least one neighboring node within the collision domain of the local node; and a broadcasting unit configured to broadcast the HELLO packet constructed by the second constructing unit, so that a node receiving the HELLO packet performs slot reservation according to information contained in the HELLO packet.

According to a second aspect of the embodiments of the present invention, there is provided a method for assigning slot, including:

constructing an HELLO packet, the HELLO packet including GTS request information of a local node or including GTS request information of the local node and GTS request information of at least one neighboring node within a collision domain of the local node; and broadcasting the HELLO packet, so that a node receiving the HELLO packet performs slot reservation according to information contained in the HELLO packet.

The advantage of the embodiments of the present invention resides in that with the method and apparatus for assigning slot provided by the embodiments of the present invention, compared with a centralized slot assignment method, central controller is not needed any longer, complexity of calculation is lowered, and utilization of slot is improved.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more other drawings or embodiments. Moreover, in the drawings, like reference numerals designate corresponding parts in several drawings and may be used to designate like or similar parts in more than one embodiments.

In the drawings:

FIG. 3 is a flowchart of a method for assigning slot of an embodiment of the present invention;

FIG. 4 is a schematic diagram of a format of an implementation mode of a GTS table;

DETAILED DESCRIPTION

Foregoing and other features of the embodiments of the present invention will become apparent through the following description with reference to the accompanying drawings. These embodiments are illustrative only and are not intended to limit the present invention.

For easy understanding of the principle and embodiments of the present invention by those skilled in the art, the embodiments of the present invention shall be described taking an ad hoc network as an example. However, it should be understood that the present invention is not limited thereto, and is applicable to other multi-hop networks, such as wireless communications, and a smart grid, etc.

Figure 1:
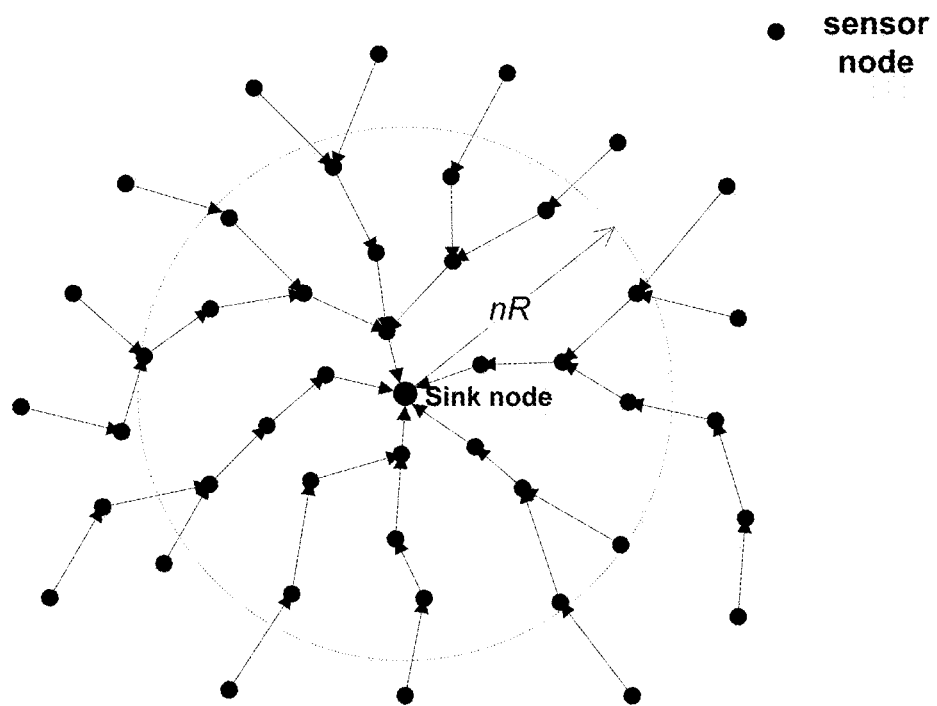
FIG. 1 is a schematic diagram of a collision domain surrounding a sink node.

An embodiment of the present invention provides a method for assigning slot towards the convergecast in the tree topology. The tree topology is composed of one sink node and a large amount of sensor nodes. Each sensor node generates data periodically, and the sink node is the only root of the tree. As shown in FIG. 1, in the tree topology, each node has only one father node, which is the next hop of routing taking the sink node as a target. In the embodiments of the present invention, the slots are assigned in a distributed manner, and each node needs only to select an appropriate slot for a link reaching its father node.

Figure 2:
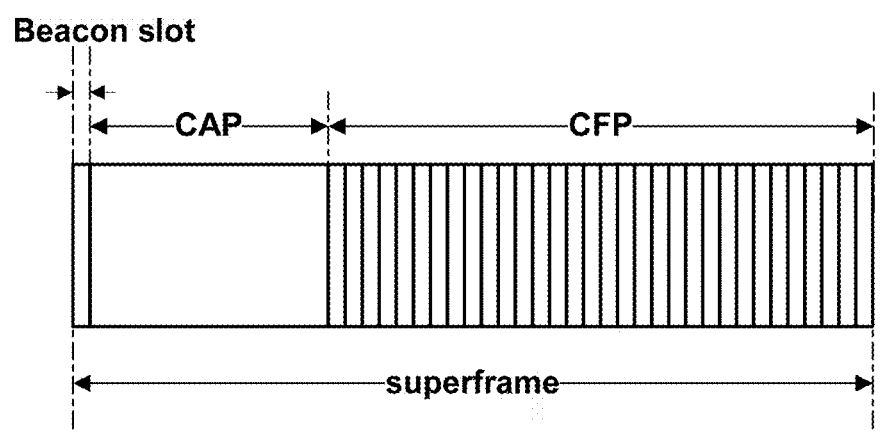
FIG. 2 is a schematic diagram of a structure of a superframe designated in IEEE 802.15.4.

The embodiments of the present invention are based upon a superframe specified in IEEE 802.15.4 standard. The superframe includes three parts: a beacon slot, a contention access period (CAP) and a contention-free period (CFP), as shown in FIG. 2. In the CAP, intending transmitters contend to access to a channel using a CSMA (carrier sense multiple access) mechanism. In the CFP, the intending transmitters access to a channel in a time division multiple access (TDMA) manner. Furthermore, each transmitter is capable of transmitting data in more than one slots. One slot is long enough to transmit one and only one packet. All slots dedicated to one node are referred to as GTS. However, how to assign such slots in a CFP is not discussed in IEEE 802.15.4.

An embodiment of the present invention proposes a distributed slot assignment method based on the structure of a superframe shown in FIG. 2. With such a method, slots in a CFP may be appropriately assigned to support convergecast in tree topology. The method and apparatus for assigning slot of the embodiments of the present invention shall be described below in detail with reference to the accompanying drawings and particular embodiments.

Embodiment 1

An embodiment of the present invention provides a method for assigning slot. FIG. 3 is a flowchart of the method. Referring to FIG. 3, the method includes:

step 301: constructing an HELLO packet, the HELLO packet including GTS request information of a local node or including GTS request information of a local node and GTS request information of at least one neighboring node within a collision domain of the local node; and step 302: broadcasting the HELLO packet, so that a node receiving the HELLO packet performs slot reservation according to information contained in the HELLO packet.

In the embodiment of the present invention, each node may construct the GTS request information of the neighboring node of the HELLO packet based on a locally saved GTS table, and may construct the GTS request information of the local node of the HELLO packet based on selection of GTS by the local node.

In this embodiment, in order to construct the GTS request information of the neighboring node of the HELLO packet, each node saves a GTS table, which contains GTS request information of all the neighboring nodes within a collision domain of the node, the information being obtained by receiving an HELLO packet and collecting GTS request information of the neighboring nodes within the collision domain thereof. As the local GTS table is blank before receiving an HELLO packet for the first time, if an HELLO packet is transmitted before receiving an HELLO packet for the first time, the GTS request information of the neighboring nodes in the HELLO packet is also blank. In an implementation mode, the local node may select a part of records from the local GTS table according to a predetermined policy and take them as the GTS request information of the neighboring node. For example, if a maximum hop count of the neighboring nodes within the collision domain of the local node is n, the local node may take records of all one-hop neighboring nodes and records of 2 to n–1-hop neighboring nodes with confirmation information being agree within the collision domain of the local node in the local GTS table as the GTS request information of the neighboring nodes, or may take records of all 1 to n–1-hop neighboring nodes in the local GTS table as the GTS request information of the neighboring node. What described above are examples only, and the embodiment of the present invention is not limited thereto, and the local node may select a record from the local GTS table according to other policies. For example, if the numbers of the records in the local GTS table is less than a predetermined number, the local node may select all the records in the local GTS table, etc.

FIG. 4 is a schematic diagram of a format of an implementation mode of the GTS table. As shown in FIG. 4, each node maintains such a GTS table that records routing and GTS information of other nodes within its collision domain. Each record contains seven elements. Taking record i as an example, "$Tx_i$" is the ID of a node i; "$Rx_i$" is the father (which is also the next hop of routing taking the sink node as a target) of the node i; "$exp_i$" and "offset" constitute a GTS required by the node i; "$T_i$" is the traffic of the node i (shown in formula (8)); "$distance_i$," is the hop count from the node i to a current node; for example, the distance of 2-hop neighboring node is 2; for another example, taking a 3-hop collision domain as an example, the "$distance_i$" is 1, 2 or 3; and "comment" is the confirmation made by the current node for $GTS_i$, which is denial or agree.

In this embodiment, in order to construct the GTS request information of the local node of the HELLO packet, a requested GTS needs to be selected.

In an implementation mode, the local node saves reservation history information of the local node. The reservation history information indicates a locally requested GTS, and further indicates state of the locally requested GTS. At this moment, correlation information of the locally requested GTS in the reservation history information is still taken as the GTS request information of the local node when the locally requested GTS does not vary and the state of the locally requested GTS is valid according to the reservation history information; and on the contrary, a GTS needs to be re-selected and correlation information of the re-selected GTS is taken as the GTS request information of the local node when the locally requested GTS varies or the state of the locally requested GTS is invalid.

In another implementation mode, the local node does not save reservation history information of the local node. And at this moment, a GTS may be directly selected, and correlation information of the selected GTS is taken as the GTS request information of the local node.

Detailed description of the two implementation modes shall be given below with reference to the accompanying drawings. Wherein, as the method of reselecting a GTS in the former implementation mode is identical to the method of selecting a GTS in the latter implementation mode, detailed process of realization shall not be repeated.

Figure 5:
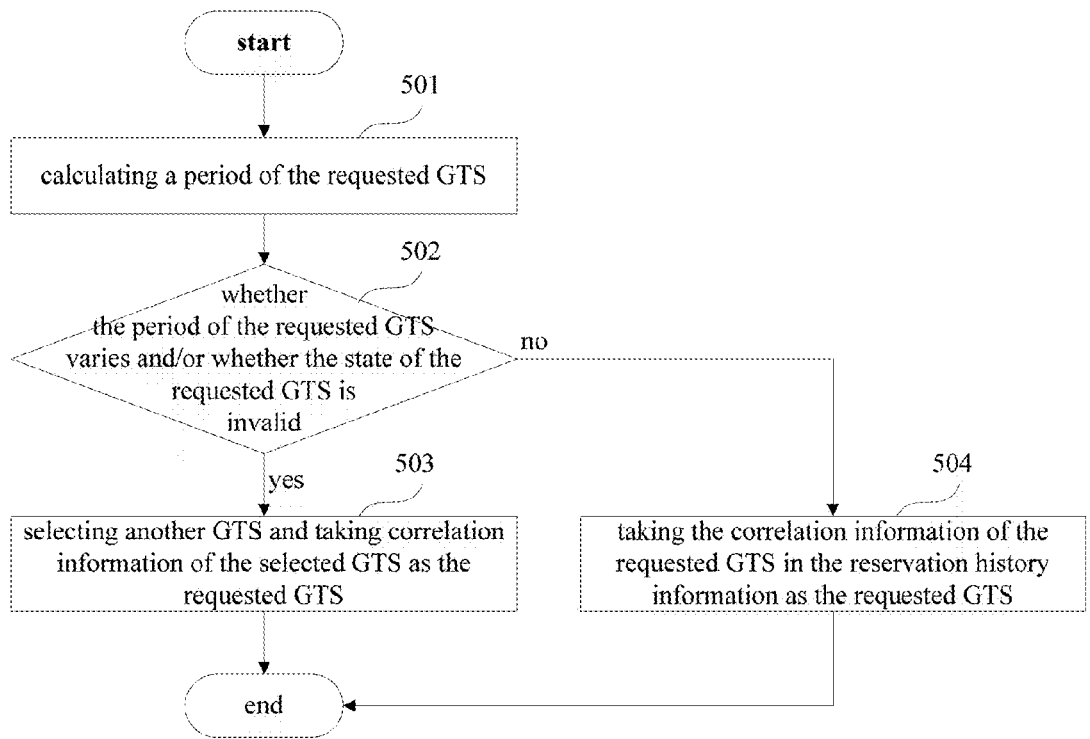
FIG. 5 is a flowchart of an implementation mode of determining a requested GTS period.
Figure 6:
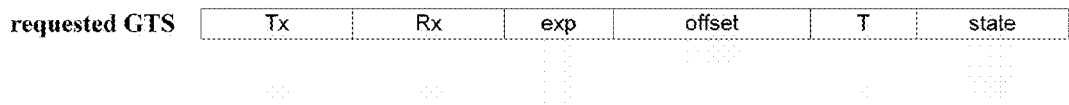
FIG. 6 is a schematic diagram of a format of an implementation mode of locally saved reservation history information.

FIG. 5 is a flowchart of a method of determining a requested GTS according to the locally saved reservation history information. Referring to FIG. 5, the method includes:

step 501: calculating a period of the requested GTS;

wherein, each GTS contains two elements, one is period, and the other is offset; in this embodiment, if the period of the requested GTS varies, the requested GTS varies necessarily, and a new GTS needs to be re-selected; therefore, in this embodiment, the period of the requested GTS is calculated first, and then is compared with the locally saved reservation history information of the local node, so as to determine whether the period of the requested GTS varies;

wherein, the period of the requested GTS may be calculated according to local traffic and traffic within a collision domain of a sink node, and may also be calculated according to other policies, which shall be described below in detail;

step 502: judging whether the period of the requested GTS varies and/or whether state of the requested GTS is invalid according to the locally saved reservation history information of the local node;

wherein, the local node may also save history information of the GTS requested by the local node, which is referred to in this embodiment as GTS request information or reservation history information of the local node; as described above, the reservation history information may only contain the GTS requested by the local node, and may also contain the GTS requested by the local node and the state of the GTS requested by the local node;

FIG. 6 is a schematic diagram of a format of an implementation mode of correlation information of the requested GTS; as shown in FIG. 6, the correlation information includes six elements; wherein, "state" may be valid or invalid, which depends on comments collected from the neighboring nodes; and the meanings of other elements are identical to those of the corresponding elements in the GTS table, which shall not be described herein any further; wherein, the element "state" is optional, that is, in other implementation modes of the embodiment of the present invention, the element "state" may not be contained, and whether the requested GTS is valid may be indicated in other manners; for example, when the locally requested GTS is invalid, a certain element in the reservation history information is set as a first predetermined value (such as setting a certain element as a negative value); and when the locally requested GTS is valid, the elements of the reservation history information are set as a second predetermined value (such as setting the elements as a normal value), thereby whether the requested GTS is valid may be indicated, and the element "state" is unneeded;

step 503: selecting another GTS and taking correlation information of the selected GTS as the requested GTS if the period of the requested GTS varies or the state of the requested GTS is invalid;

wherein, as the previously selected GTS can be used no longer, a new GTS needs to be selected; in an implementation mode, corresponding to the calculated period of the requested GTS, a locally constructed GTS binary tree may be searched according to a predetermined policy, and a first idle GTS on the line where the period of the requested GTS is present may be selected, or a GTS with a GTS offset less than a GTS offset of its receiving node; and wherein, the predetermined policy is, for example, searching the locally constructed GTS binary tree from the left to the right, or searching the locally constructed GTS binary tree from the right to the left, on the line where the period of the requested GTS is present; however, the embodiments of the present invention are not limited thereto;

wherein, the method of selecting another GTS is also applicable to the case where no reservation history information is saved and a GTS is directly selected, which shall not be described herein any further;

step 504: taking the correlation information of the requested GTS in the reservation history information as the requested GTS if the period of the requested GTS does not vary and the state of the requested GTS is valid.

With the method of FIG. 5, the GTS request information (newly selected or saved) of the local node may be determined.

Figure 7:
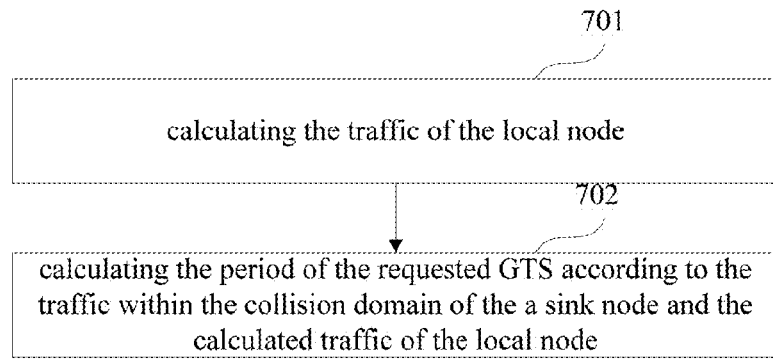
FIG. 7 is a flowchart of an implementation mode of calculating a requested GTS period.

In an implementation mode of step 501, the period of the requested GTS may be calculated according to the traffic of the local node and the traffic within the collision domain of the sink node. FIG. 7 is a flowchart of the implementation mode. As shown in FIG. 7, the method includes:

step 701: calculating the traffic of the local node;

wherein, the traffic of the local node may be obtained by traversing each of the records in the local GTS table and adding the traffic to which a record with receiving node being the local node in the records corresponds into the traffic of the local node; and step 702: calculating the period of the requested GTS according to the following formula by using the traffic within the collision domain of a sink node and the calculated traffic of the local node:

$$\exp = \text{integer}\left[\log_2\left(\frac{T_{CD-sink}}{T_i}\right)\right] = x;$$

$$\text{where, } x - 1 < \log_2\left(\frac{T_{CD-sink}}{T_i}\right) \le x,$$

x being an integer, $T_{CD\text{-}sink}$ being the traffic within the collision domain of the sink node, $T_i$ being the traffic of the local node, and $2^{exp}$ being the period of the requested GTS.

In this implementation mode, if the local node is the sink node, the traffic within the collision domain of the sink node may be obtained through calculation; and if the local node is not the sink node, the traffic within the collision domain of the sink node may be obtained through exchange of an HELLO packet, that is, the HELLO packet further contains the traffic within the collision domain of the sink node.

Wherein, the total traffic in the collision domain of the sink node may be obtained by traversing each of the records in the local GTS table and adding the traffic to which each record corresponds into the total traffic within the collision domain of the sink node.

Wherein, each node may save the traffic within the collision domain surround the sink node (marked as $T_{CD\text{-}sink}$), and in constructing the HELLO packet, add the traffic within the collision domain of the sink node into the HELLO packet.

The manner shown in FIG. 7 that calculates the period of the requested GTS according to the local traffic and the traffic within the collision domain of the sink node is an example only, and the embodiment of the present invention is not limited thereto. In other implementation modes, the period of the requested GTS may be calculated according to other policies. For example, calculating the period of the requested GTS according to the hop count from the local node to the sink node, and determining the period of the requested GTS following a principle of the larger the hop count (i.e. the farther from the sink node), the larger the period (the less the needed slots).

Figures 8, 9:
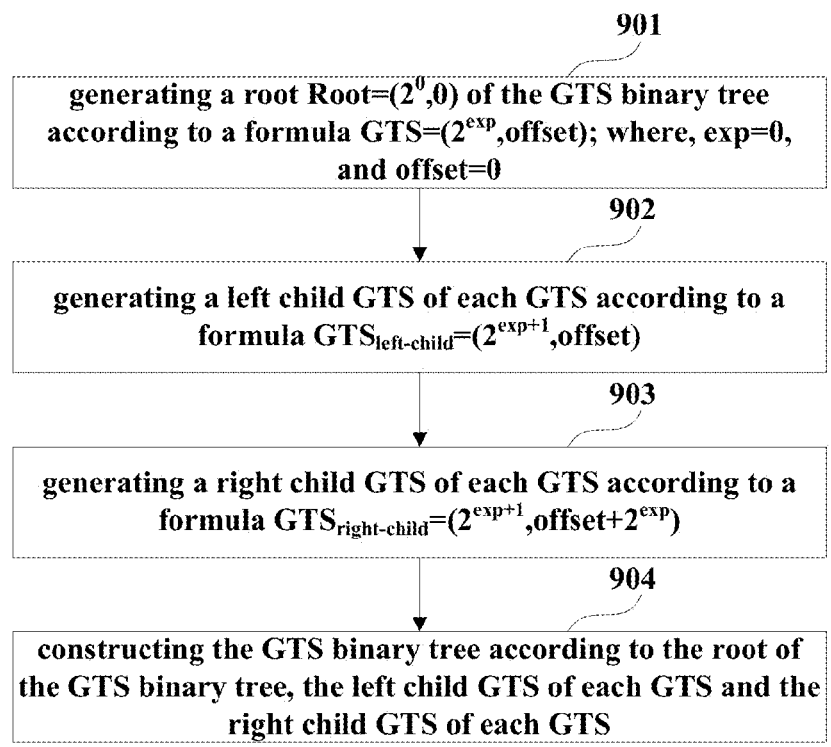
FIG. 8 is a schematic diagram of a format of an implementation mode of an HELLO packet.
FIG. 9 is a flowchart of constructing a GTS binary tree.

FIG. 8 is a schematic diagram of an implementation mode of a format of an HELLO packet constructed according to an embodiment of the present invention. Referring to FIG. 8, besides an original source address and an original destination address, the HELLO packet further includes GTS request information of the local node and GTS request information of at least one neighboring node within the local collision domain of the local node, and optionally, further includes traffic $T_{CD\text{-}sink}$ within the collision domain of the sink node. The GTS request information of the local node consists of five elements, which are an address (Tx) of a transmission node of the HELLO packet, an address (Rx) of a receiving node of a data packet to be transmitted by the transmission node of the HELLO packet, exp and offset of a GTS requested by the transmission node of the HELLO packet, and traffic of the transmission node of the HELLO packet, respectively. Wherein, the GTS request information of at least one neighboring node within the collision domain of the local node consists of seven elements, which have same meanings as those of the elements in the GTS table, and shall not be described herein any further. Optionally, the HELLO packet may further include the traffic $T_{CD\text{-}sink}$ within the collision domain of the sink node, and if the node is the sink node, $T_{CD\text{-}sink}$ may be obtained through calculation; and if the node is not the sink node, $T_{CD\text{-}sink}$ may be acquired via the received HELLO packet.

In the embodiment of the present invention, each node selects a needed GTS based on the constructed GTS binary tree, and performs negotiation on the GTS. Hence, in this embodiment, a GTS binary tree may be constructed in advance. In particular, a method of constructing a GTS binary tree may be carried out by the method shown in FIG. 9. Referring to FIG. 9, the method includes:

step 901: generating a root Root=($2^0$,0) of the GTS binary tree according to a formula GTS=($2^{exp}$,offset); where, exp=0, and offset=0;

step 902: generating a left child GTS of each GTS according to a formula $GTS_{left\text{-}child}$=($2^{exp+1}$,offset);

step 903: generating a right child GTS of each GTS according to a formula $GTS_{right\text{-}child}$=($2^{exp+1}$,offset+$2^{exp}$);

step 904: constructing the GTS binary tree according to the root of the GTS binary tree, the left child GTS of each GTS and the right child GTS of each GTS.

In this embodiment, if a HELLO packet is received, total traffic within the collision domain of the sink node may be updated according to the received HELLO packet, and/or, an authentication result given by the sender of the HELLO packet to locally requested GTS may be determined, and/or, a GTS list in the HELLO packet may be merged with the local GTS table, and/or, a GTS requested by the sender of the HELLO packet may be authenticated, thereby completing the negotiation of the GTS.

Wherein, updating the total traffic within the collision domain of the sink node may be carried out by comparing the total traffic within the collision domain of the sink node in the HELLO packet and the locally saved total traffic within the collision domain of the sink node. And if the total traffic within the collision domain of the sink node in the HELLO packet is greater than the locally saved total traffic within the collision domain of the sink node, the locally saved traffic within the collision domain of the sink node is updated; otherwise, the locally saved traffic within the collision domain of the sink node is kept unchanged.

Wherein, determining the authentication result given by the sender of the HELLO packet to the locally requested GTS may be carried out by scanning each record in the GTS list of the HELLO packet. A record with an address of a transmission node being the address of the local node may be found by scanning each record in the GTS list of the HELLO packet, the record being the correlation information of the locally requested GTS; if the confirmation information of the record is denial, it is determined that the locally requested GTS is invalid, and at this moment, the local reservation history information may be modified, such as modifying the state of the locally requested GTS into being invalid, or setting the locally requested GTS to be blank, etc.; and if the confirmation information of the record is agree, it is determined that the locally requested GTS is valid, and at this moment, the state of the locally requested GTS is kept unchanged.

Wherein, merging the GTS list in the HELLO packet with the local GTS table may be carried out by comparing each record in the GTS list of the HELLO packet with each record in the local GTS table. And a record in the GTS list of the HELLO packet with confirmation information being agree may be merged with the local GTS table. Wherein, if the record with confirmation information being agree has been stored in the local GTS table, when a distance of the record is smaller than a distance of a corresponding record in the local GTS table, the corresponding record in the local GTS table is replaced with the record in the HELLO packet, and 1 is added to the distance of the record; and wherein, if the record with confirmation information being agree has not been stored in the local GTS table, the record is added into the local GTS table, and 1 is added to the distance of the record.

Wherein, authenticating the GTS requested by the sender of the HELLO packet may be carried out by comparing the GTS requested by the sender of the HELLO packet with the records in the local GTS table and the locally requested GTS. First, local receiving interference detection is performed, so as to determine whether the GTS requested by the sender of the HELLO packet collides with a GTS requested by a neighboring node taking the local node as a receiving node; then local transmission interference detection is performed, so as to determine whether the GTS requested by the sender of the HELLO packet collides with the locally requested GTS; if they do not collide, grant agree to the GTS requested by the sender of the HELLO packet; and if they collide, grant agree to the GTS requested by the sender of the HELLO packet when an address of the sender of the HELLO packet is larger than an address of the neighboring node (the former collides), or when an address of the sender of the HELLO packet is larger than an address of the local node (the latter collides); otherwise, grant denial to the GTS requested by the sender of the HELLO packet.

With the method of the embodiment of the present invention, complexity of calculation is lowered, and utilization of slot is improved.

For more clear and easy understanding of the method of the embodiment of the present invention, it shall be described below in detail in conjunction with processes of constructing a GTS binary tree, selecting a GTS and negotiating a GTS.

In multi-hop tree topology, a node at an intermediate part of a branch needs to forward a data packet for its children node. Hence, it is difficult to predict the arriving time of the data packet. If a GTS includes multiple consecutive slots, efficiency will be lowered once the data packet arrives later than these slots. The GTS in the embodiments of the present invention is defined as periodical pattern. As shown in formula (1), the GTS includes two elements, and for one GTS, a first dedicated slot is indexed by "offset", and the following dedicated slots repeat every periodic slot.

$$(\text{period}, \text{offset}), (0 \le \text{offset} < \text{period}) \qquad (1).$$

For convergecast in the tree topology, a node near the top of the tree needs to forward more data packets relative to a node near the bottom of the tree. Hence, for different nodes, their periods should be different. A node having large traffic load has a small period, and a node having small traffic load has a large period. However, different periods may result in collision, such as a case shown in formula (2).

$$\text{offset}_1 + n \times \text{period}_1 = \text{offset}_2 + m \times \text{period}_2 \qquad (2).$$

An embodiment of the present invention proposes a special GTS selection method to avoid such collision. And a period is calculated based on a power of 2, hence, a GTS may be expressed as:

$$(2^{exp}, \text{offset}), (0 \le \text{offset} < 2^{exp}) \qquad (3).$$

Figure 10:
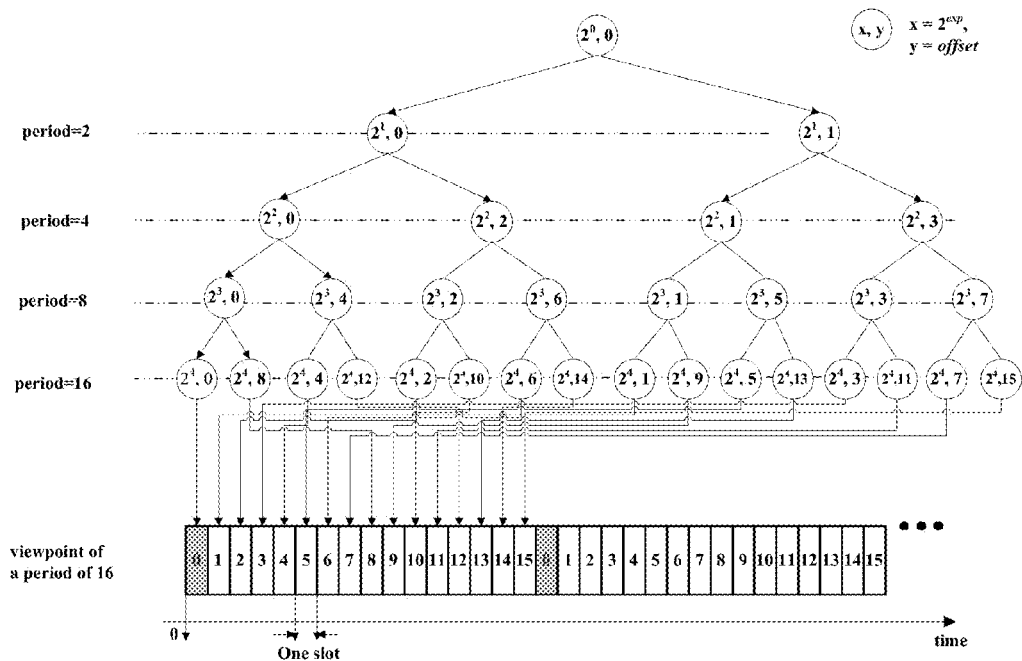
FIG. 10 is a schematic diagram of a GTS binary tree of a viewpoint of a period of 16.
Figure 11:
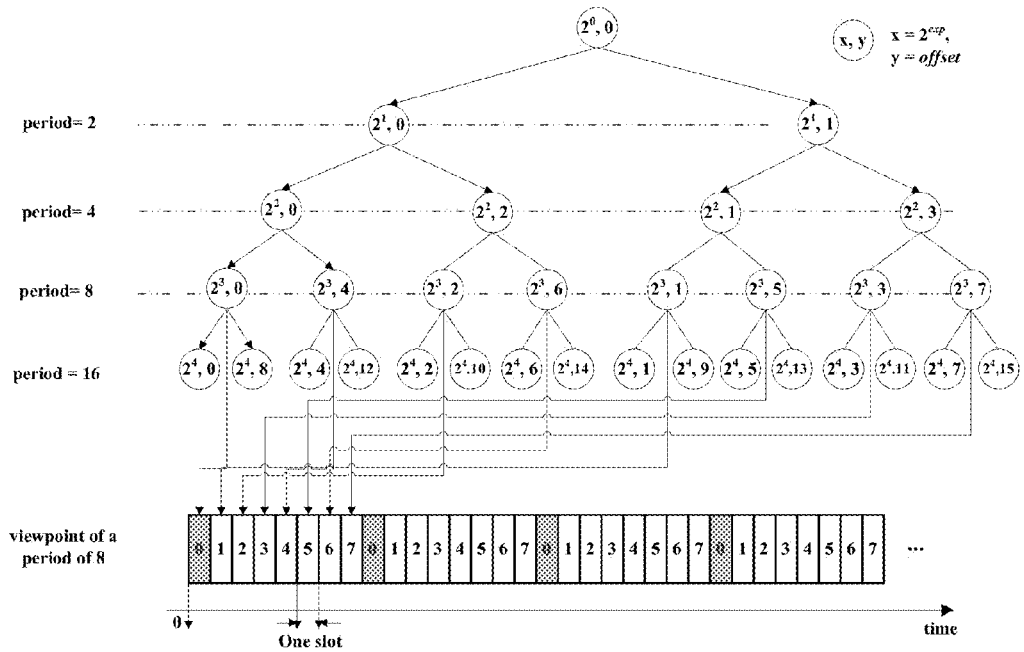
FIG. 11 is a schematic diagram of a GTS binary tree of a viewpoint of a period of 8.

In an embodiment of the present invention, all GTSs are organized by a GTS binary tree. As shown in FIGS. 10 and 11, each node on the tree denotes a GTS. Each node contains two items, that is, $(2^{exp}, \text{offset})$, which means the GTS starts from an offset-th slot, and repeats every $2^{exp}$ slots. And the root of the binary tree is $(2^0, 0)$, which is expressed as:

$$\text{Root} = (2^0, 0) \qquad (4)$$

$$\begin{cases} \exp = 0 \\ \text{offset} = 0 \end{cases}.$$

In GTS binary tree, each GTS has two children GTSs. A sum of the slots of the two children GTSs is equal to the slots contained in the parent GTS. And the two children GTSs are obtained through calculation according to formula (5).

$$GTS = (2^{exp}, \text{offset}), \qquad (5)$$

$$\begin{cases} GTS_{left-child} = (2^{exp+1}, \text{offset}) \\ GTS_{right-child} = (2^{exp+1}, \text{offset} + 2^{exp}) \end{cases}.$$

In the embodiment of the present invention, as described above, the method of constructing a GTS binary tree is as follows:

step 1: generating a root node according to formula (4); and step 2: generating a left child and a right child by each node according to formula (5).

The GTS binary tree has two important characters. First, all the slots are contained in the GTS binary tree. As shown in FIG. 10, the slots are indexed from 0 along the time axis, and the slot repeating period on the fourth line is 16. Each GTS on the fourth line is mapped onto one slot within one period, and each slot within one period is mapped onto one GTS on the fourth line. Second, collision between two GTSs may be detected from the GTS binary tree. In the tree, the child GTS is a subset of its parent GTS. Therefore, for any two GTSs having different periods, if one GTS is the ancestor (a parent, or a parent of a parent, or a parent of a parent of a parent, and so on) of another GTS, they collide with each other. Simple speaking, if the two GTSs are on the same branch, collision will occur.

Based on the above two characters, a GTS is selected from a GTS binary tree rather than from a time axis in the embodiment of the present invention. Afterwards, the problem is to determine which period is suitable for each node in the tree topology network. As described above, it is expected that a node having large traffic has a smaller period, and a node having small traffic has a larger period. Therefore, in a preferred implementation mode of the embodiment of the present invention, a period needed by each node is calculated based on the traffic.

In the embodiment of the present invention, total traffic within one collision domain is defined as traffic of the collision domain. And a period of each node is a ratio of the traffic of the node to the traffic of the collision domain, which is expressed by formula (6).

$$\text{period}_i = \frac{T_{CDi}}{T_i}; \qquad (6)$$

where, $T_{CDi}$ is the traffic within a collision domain surround node i, and $T_i$ is the traffic of the node i.

Turning back to formula (3), the exp of the node i may be obtained according to formula (7), thereby obtaining a period $2^{exp}$ of the node i.

$$\exp = \text{integer}\left[\log_2\left(\frac{T_{CDi}}{T_i}\right)\right] = x, \qquad (7)$$

$$\text{where, } x - 1 < \log_2\left(\frac{T_{CDi}}{T_i}\right) \le x,;$$

x being an integer.

In an implementation mode of this embodiment, as described above, the exp may be calculated according to the following method.

In a sensor network, typically, all sensor nodes generate data periodically at the same frequency, and the sink node collects these data accordingly. In the embodiment of the present invention, the slot assignment is periodical pattern. Hence, the slot assignment method focuses on one data period. And as the assigned slots are repeated along with the time, they may be used in subsequent data periods.

Traffic of one node is defined as the number of data packets that must be transmitted by the node within one data period. The traffic of the node i is denoted by $T_i$, which contains the data generated by it and the data forwarded for its children node. And $T_i$ may be obtained through calculation according to formula (8).

$$T_i = \sum_{j \in Child_i} T_j + 1; \qquad (8)$$

where, $Child_i$ is the children collection of the node i. According to formula (8), $T_i$ needs to be calculated recursively. In this method, each node periodically broadcasts HELLO packets, hence, latest information may be exchange among neighboring nodes, such as $T_i$. A flow of calculating $T_i$ shall be described below.

Figure 12:
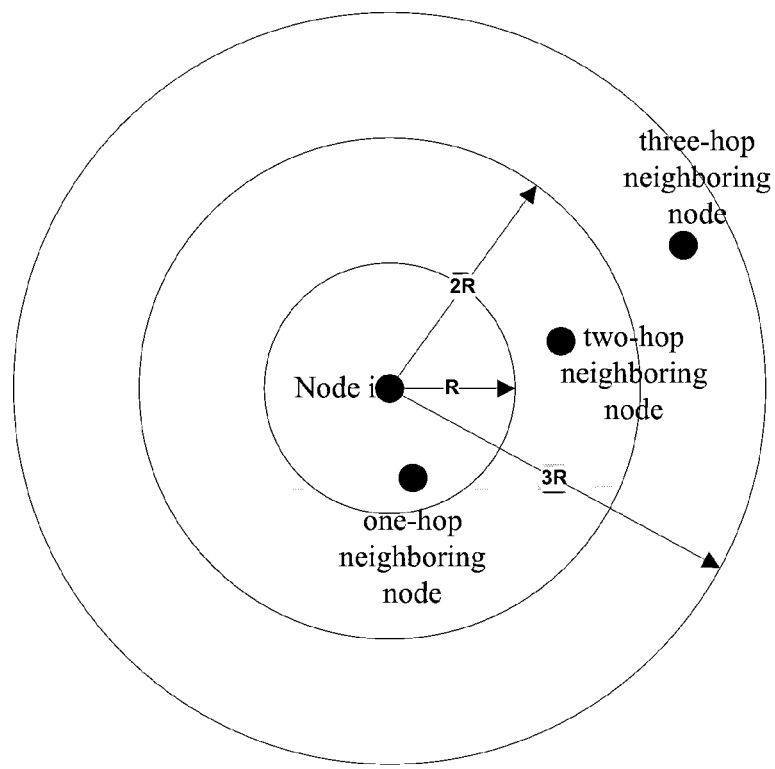
FIG. 12 is a schematic diagram of a 1-hop neighboring node, a 2-hop neighboring node and a 3-hop neighboring node.

It is assumed that a transmission model is a unit circle, and a transmission radius is denoted by R. In the view point of one node i, its one-hop neighboring nodes are neighboring nodes that may be directly reached by HELLO packet broadcast, its two-hop neighboring nodes are neighboring nodes that may be reached through forwarding an HELLO packet for at least one time, its three-hop neighboring nodes are neighboring nodes that may be reached through forwarding an HELLO packet for at least two times, and so on for definitions of four-hop to n-hop neighboring nodes, as shown in FIG. 12.

Figure 13:
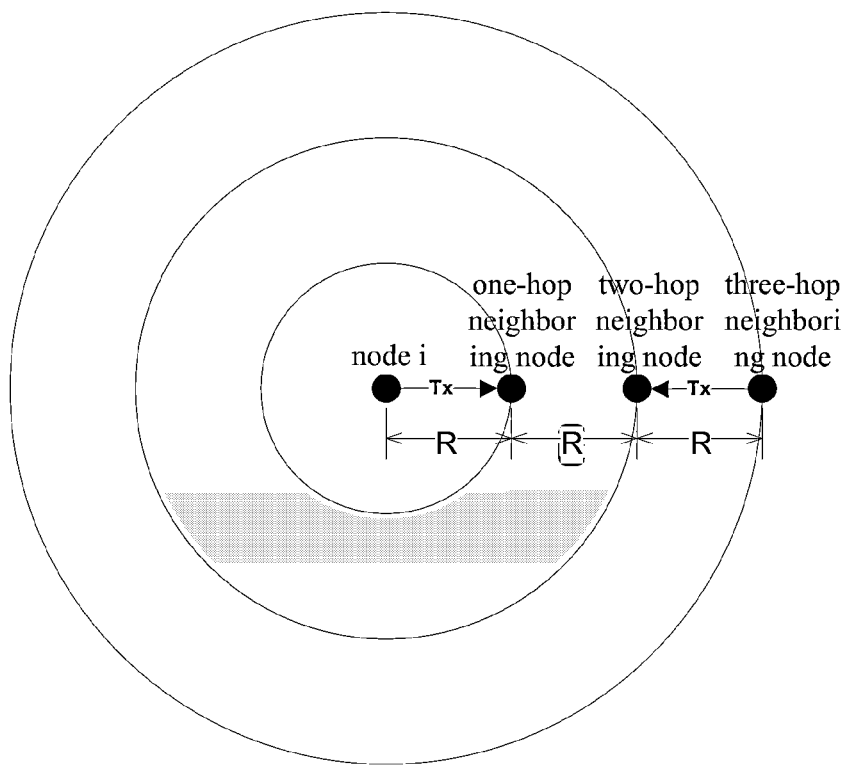
FIG. 13 is a schematic diagram of a collision domain.

One of the implementation method is that the interference radius is twice of the transmission radius. In the view of node i, its transmission interferes with the receiving of one-hop and two-hop neighboring nodes, and its receiving is interfered by the transmission of the one-hop and two-hop neighboring nodes. Taking FIG. 13 as an example, if the node i and its three-hop neighboring nodes transmit data at the same time, the transmission of the node i will interfere with the receiving of its two-hop neighboring nodes. In order to provide sufficient interference-free protection, any transmissions within three hops can not happen at the same slot. A three hops area taking a node as the center is defined as a collision domain (CD). FIG. 1 illustrates collision domains surround the sink node.

All data transmission within one collision domain needs to be performed in different slots. Therefore, the more traffic one collision domain contains, the more slots that are needed. Traffic within one collision domain is equal to the total traffic of all the nodes within the collision domain, which is denoted by $T_{CD}$. Traffic within one collision domain CD, taking the node i as the center may be obtained through calculation by using formula (9).

$$T_{CDi} = \sum_{j \in CD_i} T_j + T_i. \qquad (9)$$

A collision domain containing a maximum $T_{CD}$ is a bottleneck of a network and limits a throughput of convergecast. Hence, a suitable GTS period of the node i is:

$$\text{period}_i = \frac{\max(T_{CD})}{T_i}. \qquad (10)$$

In the convergecast, the collision domain taking the sink node as the center contains the maximum $T_{CD}$, and $T_{sink}$ is 0. Combining formulae (9) and (10), a suitable GTS period may be obtained through calculation by using formula (11).

$$\text{period}_i = \frac{T_{CD-sink}}{T_i} = \frac{\sum_{j \in CD_{sink}} T_j}{T_i}. \qquad (11)$$

Turning back to formula (7), the GTS period is a power of 2, and the exp may be an integer. Therefore, a method for calculating the exponent exp of the GTS period is:

$$\exp = \text{integer}\left[\log_2\left(\frac{T_{CD-sink}}{T_i}\right)\right] = x, \qquad (12)$$

$$\text{where, } x - 1 < \log_2\left(\frac{T_{CD-sink}}{T_i}\right) \le x,;$$

x being an integer.

In the embodiment of the present invention, in order to calculate a suitable GTS period for individual node, $T_{CD-sink}$ and $T_i$ are necessary, and these two parameters may be calculated in an exchanging procedure of an HELLO packet.

In the embodiment of the present invention, the GTS assignment is performed in a distributed manner, and each node needs only to reserve a GTS for a link to its father node. Each node collects information of all the other nodes within its collision domain, and selects GTS based on the information. Thereafter, it broadcasts the GTS selected by it to its one-hop nodes, and waits for comments from its neighboring nodes. Once denial comment is given by a neighboring node, it re-selects another GTS. Each node repeats such a distributed flow, until all nodes achieves an agreement on GTS assignment. Wherein, both the information collection and the GTS negotiation are conducted via HELLO packet broadcast. Turning back to FIG. 2, the CAP period is accessed by the CSMA, and the CFP period is accessed by the TDMA. In the embodiment of the present invention, the HELLO packet is broadcasted in the CAP period, hence, the slots in the CFP may be properly assigned among the nodes in the tree topology.

In order to support the flow, each node needs to maintain a GTS table as described above, such as the example shown in FIG. 4, which shall not be described herein any further.

Furthermore, each node may record a needed GTS, which contains 6 elements in an embodiment as described above, such as the example shown in FIG. 6, which shall not be described herein any further.

Figure 14:
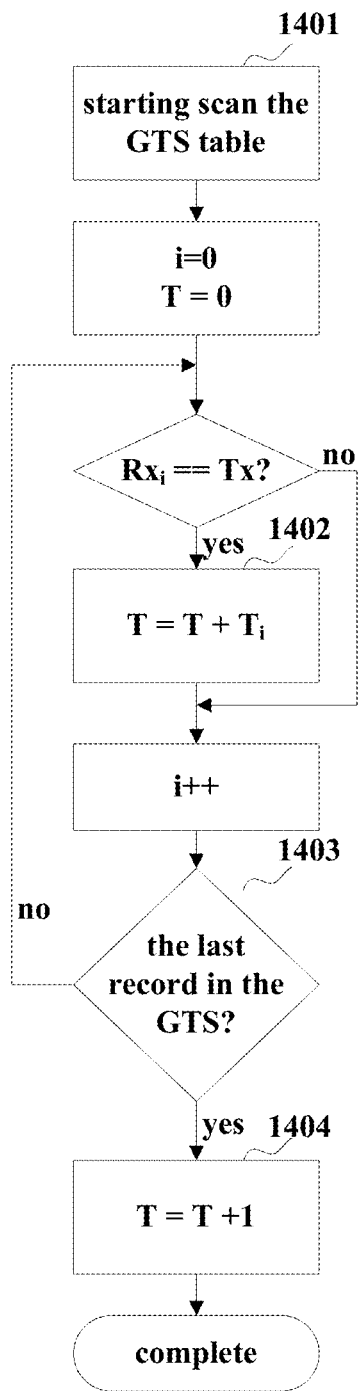
FIG. 14 is a flowchart of calculating traffic at a sensor node.

In this embodiment, an implementation mode of calculating traffic according to formula (8) is as shown in FIG. 14, and for each sensor node, a flow of calculating a traffic is:

step 1401: scanning the GTS table from a first record;

step 1402: adding $T_i$ to the traffic of the local node if $Rx_i$ is the local node;

step 1403: turning back to step 1404 if the record is the last one; otherwise, preceding with the next record, and turning back to step 1402; and step 1404: adding 1 to $T_i$, and completing the calculation of the traffic.

Figure 15:
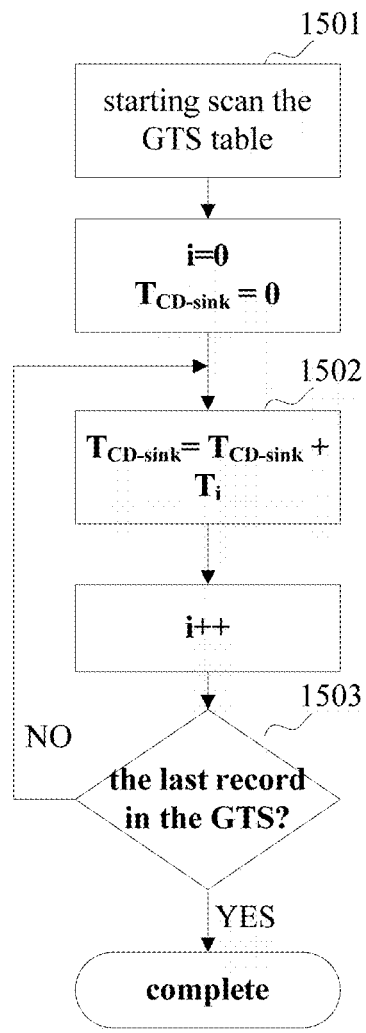
FIG. 15 is a flowchart of calculating traffic of a collision domain at a sink node.

In this embodiment, an implementation mode of calculating traffic within the collision domain surround the sink node according to formula (9) is as shown in FIG. 15. For the sink node, its traffic is 0, and a flow of calculating the traffic within the collision domain is:

step 1501: setting $T_{CD\text{-}sink}$ to be 0, and scanning the GTS table from a first record;

step 1502: adding $T_i$ to $T_{CD\text{-}sink}$; and step 1503: the calculation completes if the record is the last one; otherwise, preceding with the next record, and turning back to step 1502.

In the embodiment of the present invention, the traffic of the collision domain surround the sink node, the needed GTS and the information of the neighboring nodes within its collision domain are all carried in an HELLO packet and broadcasted to all the one-hop neighboring nodes. A format of the HELLO packet is as shown in FIG. 8.

Figure 16:
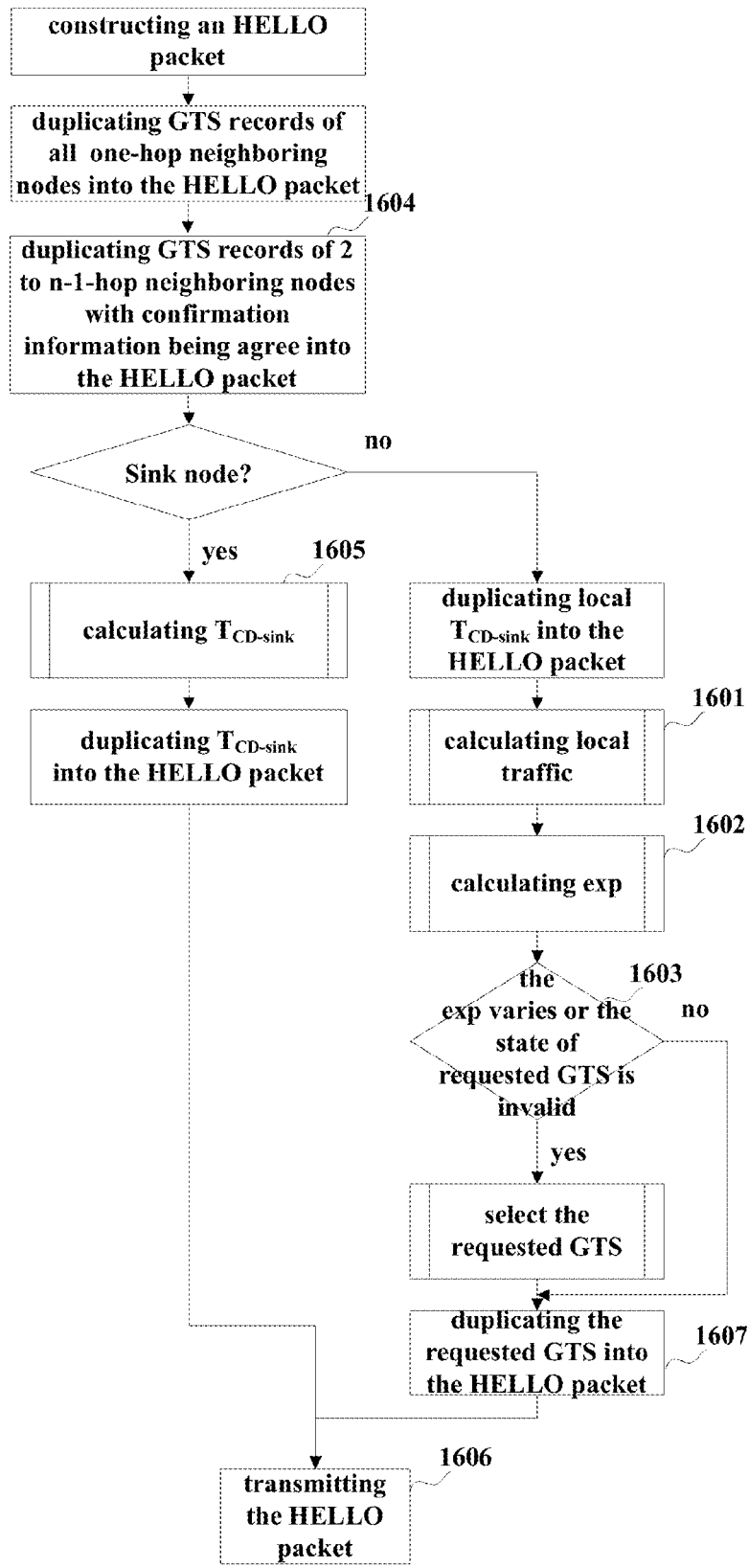
FIG. 16 is a flowchart of broadcasting an HELLO packet.

For the node i, a flow of the HELLO packet broadcast is as shown in FIG. 16:

step 1601: scanning the GTS table to calculate its traffic, and filling the traffic into a requested GTS record;

step 1602: calculating an exp according to formula (7);

step 1603: selecting a GTS if an increment of the exp is larger than 1 or the state of its needed GTS is invalid, and then executing step 1607; otherwise, directly executing step 1607;

wherein, a manner of selecting the GTS is as described above, which shall not be described herein any further;

step 1604: constructing an HELLO packet, setting "Source addr" as its address, and setting "Destination addr" as a broadcast address; duplicating GTS records of all the one-hop neighboring nodes into the HELLO packet; and for the GTS record of each 2, . . . (n−1)-hop neighboring node, if the confirmation information there of is agree, duplicating it into the HELLO packet;

step 1605: calculating $T_{CD\text{-}sink}$ and duplicating it into the HELLO packet if it is the sink node; duplicating $T_{CD\text{-}sink}$ recorded by the local node into the HELLO packet if it is not the sink node, and duplicating the needed GTS into the HELLO packet;

step 1606: transmitting the HELLO packet.

Figure 17:
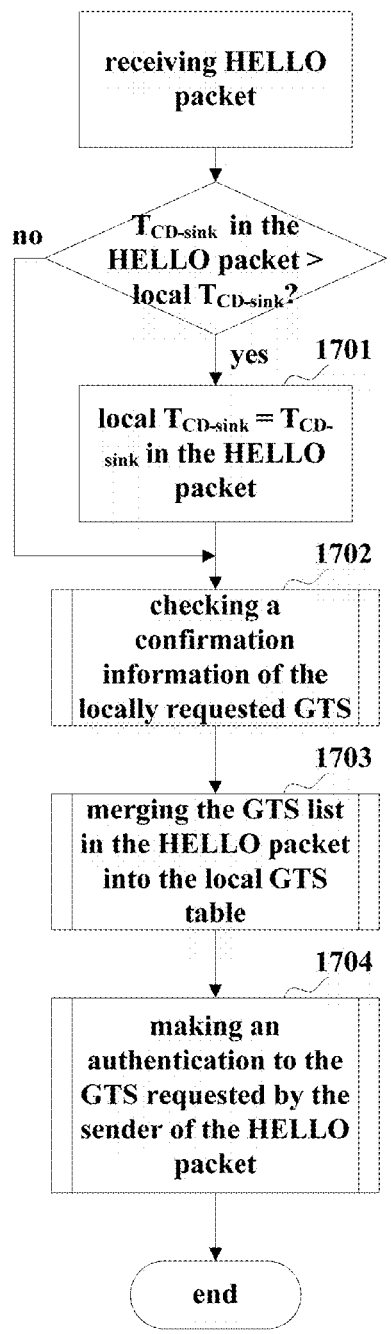
FIG. 17 is a flowchart of receiving an HELLO packet.

In the embodiment of the present invention, once a HELLO packet is received from the one-hop nodes, the node updates $T_{CD\text{-}sink}$, updates the local GTS table, and makes comment to the GTS requested by the sender of the HELLO packet. For each node, a flow of receiving the HELLO packet is as shown in FIG. 17:

step 1701: updating the local $T_{CD\text{-}sink}$ if the $T_{CD\text{-}sink}$ in the HELLO packet is larger than the local $T_{CD\text{-}sink}$;

step 1702: checking a confirmation comment given by the sender of the HELLO packet to the locally requested GTS;

step 1703: merging the GTS list in the HELLO packet into the local GTS table; and step 1704: making a comment to the GTS requested by the sender of the HELLO packet.

In step 1704, a comment is given to the GTS requested by the sender of the HELLO packet by checking whether the GTS requested by the sender of the HELLO packet influences the receiving of the local node and checking whether the transmission of the local node influences the GTS requested by the sender of the HELLO packet.

In the embodiment of the present invention, collision condition between any two GTSs (taking $GTS_1$ and $GTS_2$ as an example) are given:

(1) $Rx_1$ belongs to a 1, 2, . . . , (n−1)-hop neighbor of $Tx_2$, or $Rx_2$ belongs to a 1, 2, . . . , (n−1)-hop neighbor of $Tx_1$; and (2) $|\text{offset}_1-\text{offset}_2| \bmod 2^{exp_1}$ is 0, or $|\text{offset}_1-\text{offset}_2| \bmod 2^{exp_2}$ is 0.

If the above two conditions are satisfied, it is deemed that there exists collision.

An implementation mode of "checking a comment to the locally requested GTS" is provided below. Records in the GTS list of the HELLO packet are scanned, and for any $GTS_i$:

if "$Tx_i$" equals to the local node ID;
  if $comment_i$ is denial;
    the locally requested GTS is invalid;
  if $comment_i$ is agree;
    do nothing.

When "$Tx_i$" equals to the local node ID, it is deemed that this record corresponds to the locally requested GTS; if comment of this record is denial, it is deemed that the comment given by the sender of the HELLO packet to the locally requested GTS is denial, and the locally requested GTS is changed into being invalid; and if $comment_i$ of this record is agree, nothing shall be done.

An implementation mode of "merging a GTS table" is given below. As one-hop neighboring node, the sender of the HELLO packet may directly report the GTS requested by it; however, GTS information of two-hop and three-hop neighboring nodes needs to be forwarded by intermediate nodes. An object of merging a GTS table is to update latest GTS information of neighboring nodes out of the one-hop range, and recognize collision brought therefrom.

One of the implementation methods of merging a GTS table is as shown below. Each record in the GTS list of the HELLO packet is scanned, and for any $GTS_i$ in such list:

if the comment of the $GTS_i$ is agree;
if the $GTS_i$ is in the local GTS table already;
  if the $distance_i$ of the $GTS_i$ in the HELLO packet is smaller than the $distance_i$, of the $GTS_i$ in the local GTS table;
    replace the $GTS_i$ in the local table by the $GTS_i$ in the HELLO packet; where, the $distance_i$ is equal to the $distance_i$, of the $GTS_i$ in the HELLO packet plus 1;
    make a comment to the $GTS_i$.
  if the $distance_i$, of the $GTS_i$ in the HELLO packet is not smaller than the $distance_i$, of the $GTS_i$ in the local GTS table, do nothing to the $GTS_i$.
If the $GTS_i$ is not in the local GTS table;
  add the $GTS_i$ into the local GTS table, the distance of the local $GTS_i$ is equal to the distance of the $GTS_i$ in the HELLO packet plus 1;
  make a comment to the $GTS_i$.

An implementation mode of "making a comment" is given below. As the embodiment of the present invention is carries out in a distributed manner, a node may make a comment to GTSs of any other nodes within its collision domain. However, each node is concerned about whether the transmission and reception of itself are affected. Once collision is detected, a GTS having a relatively small Tx ID will be denied, and if one node realizes that a GTS requested by itself is denied, the node will select a new GTS. The method may guarantee non-conflicting receiving/transmission within collision domain. A flow of making a comment to a $GTS_i$ is as follows:

step 1: scanning a local GTS table; for each $GTS_j$, if the $comment_j$ is agree and $Rx_j$ is equal to the local node ID, determining whether the receiving of the local node is interfered by the $GTS_j$, and checking the $GTS_i$ and the $GTS_j$ according to the collision conditions;

if collision exists, if $Tx_i > Tx_j$, making agree comment to the $GTS_i$, and making denial comment to the $GTS_j$;

if $Tx_i < Tx_j$, making denial comment to the $GTS_i$, and making agree comment to the $GTS_j$;

step 2: if the locally requested GTS is valid, determining whether the transmission of the local node interferes the $GTS_i$, and checking the locally requested GTS and the $GTS_i$, according to the collision conditions;

if collision exists, if the local node ID > $Tx_i$, making denial comment to the $GTS_i$;

if the local node ID < $Tx_i$, making agree comment to the $GTS_i$, and setting the state of the locally requested GTS as being invalid;

step 3: if the collision does not exist in both step 1 and step 2, making agree comment to the $GTS_i$.

In this implementation mode, if collision occurs, the GTS having a relatively small Tx ID will be denied. And other authentication methods may also be carries out, such as making agree comment to a first received GTS, etc. However, the embodiment of the present invention is not limited thereto.

In this embodiment, for each node, a new GTS may be selected based on the following two conditions:

1) the increment of $T_{CD\text{-}sink}$ or local traffic is larger than a threshold value (the period of the requested GTS varies):

2) a current GTS is invalid.

One node selects a GTS suitable to the traffic of itself, thereby avoiding collision with other nodes in its collision domain. Recall that each node constructs a GTS binary tree, and each node selects an idle GTS not colliding with GTSs of other nodes within its collision domain from the tree.

Wherein, an example of selecting a GTS is as follows:

step 1: calculating an exp according to formula (7);

step 2: searching a GTS binary tree on the line of a period equals to $2^{exp}$ from the left to the right, so as to find a leftmost non-conflict GTS.

A non-conflict GTS refers to: 1) the GTS is not occupied by other nodes within the collision domain; and 2) the GTS is not an ancestor or a child of a GTS occupied by other nodes within the collision domain on the GTS binary tree.

For step 2, other methods for selecting a GTS are also applicable. For example, 1) selecting a GTS from the right to the left; and 2) selecting a GTS having an offset smaller than its father.

Figure 18A:
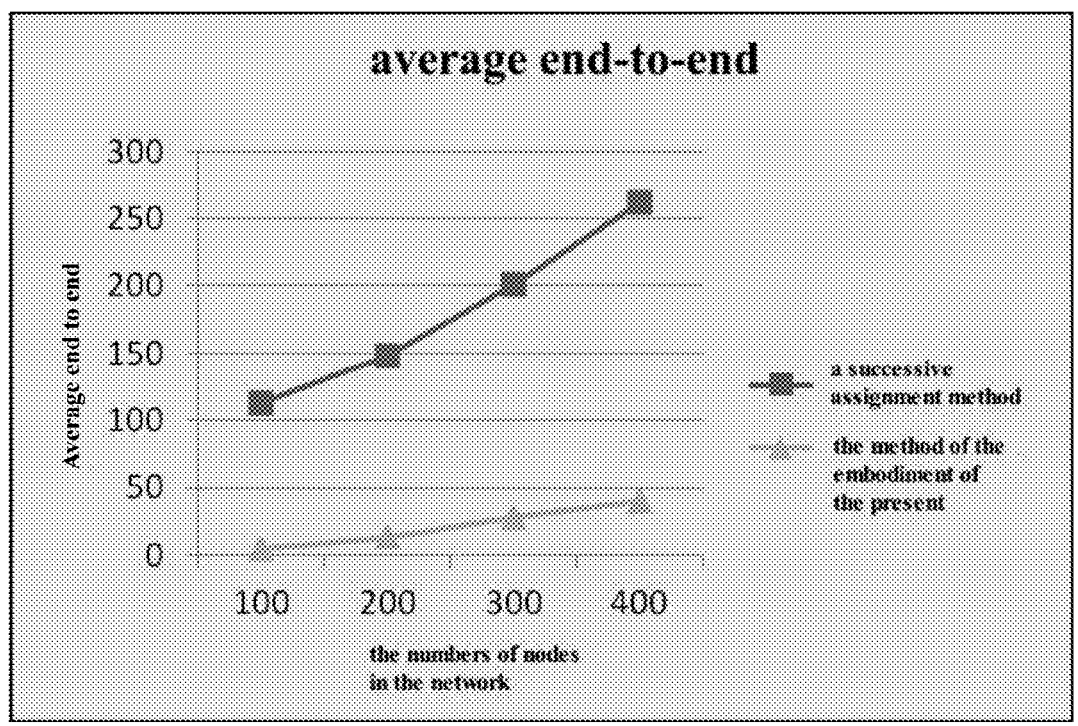
FIG. 18a is a schematic diagram of comparison of average end-to-end time delay of a method the embodiment of the present invention in comparison with a conventional slot assignment method.
Figure 18B:
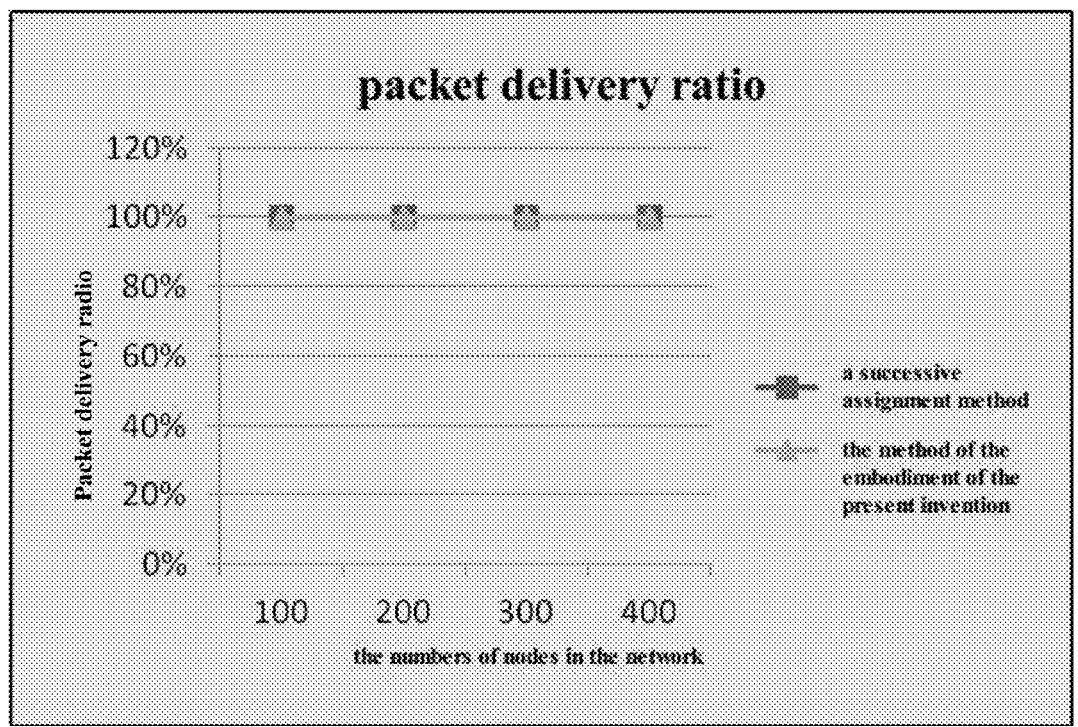
FIG. 18b is a schematic diagram of comparison of packet delivery ratio of the method of the embodiment of the present invention in comparison with a conventional slot assignment method.

FIGS. 18a and 18b show schematic diagrams of comparison of performances of the method of the embodiment of the present invention and a conventional successive slot assignment method. As shown in FIGS. 18a and 18b, a leftmost suitable GTS is selected, hence, the GTS is shared by nodes in different domains as much as possible. The method may greatly improve a rate of reuse of a slot in different spaces. Each node selects a suitable number of slots according to its traffic and traffic load condition in the network, thereby improving slots utility ratio. In comparison of the performances of the method and a conventional successive slot assignment method, when both two methods achieve 100% packet delivery ratio, the method of the embodiment of the present invention has a much smaller average delay than that of the conventional successive slot assignment method.

The slot assignment method provided by the embodiment of the present invention is distributed. The center controller is not necessary in comparison with a centralized slot assignment method. And the slot assignment method provided by the embodiment of the present invention is periodical slot assignment, and periods are different for different nodes. In comparison with a conventional slot assignment method, the period is proportional to traffic of each node in this method. As an advantage, a case where some nodes occupy too many slots not needed by them or some nodes occupy insufficient slots will not occur. As a result, in the slot assignment method provided by the embodiment of the present invention, the slot utility ratio is quite high. Furthermore, all the periodic GTSs are organized by tree structure. And selecting a GTS and detecting GTS collision based on a GTS binary tree have a low computation complexity of calculation. Furthermore, each node selects a leftmost idle GTS, therefore, one GTS may be used repeatedly in different collision domains to a maximum extent. And the high slot reusing ratio improves the slot utility ratio further.

An embodiment of the present invention further provides a node in a multi-hop network, as described in Embodiment 2 below. As the principle of the node for solving problems is similar to that of the method of Embodiment 1, the implementation of the method of Embodiment 1 may be referred to for the implementation of the node, and the identical contents shall not be described any further.

Embodiment 2

Figure 19:
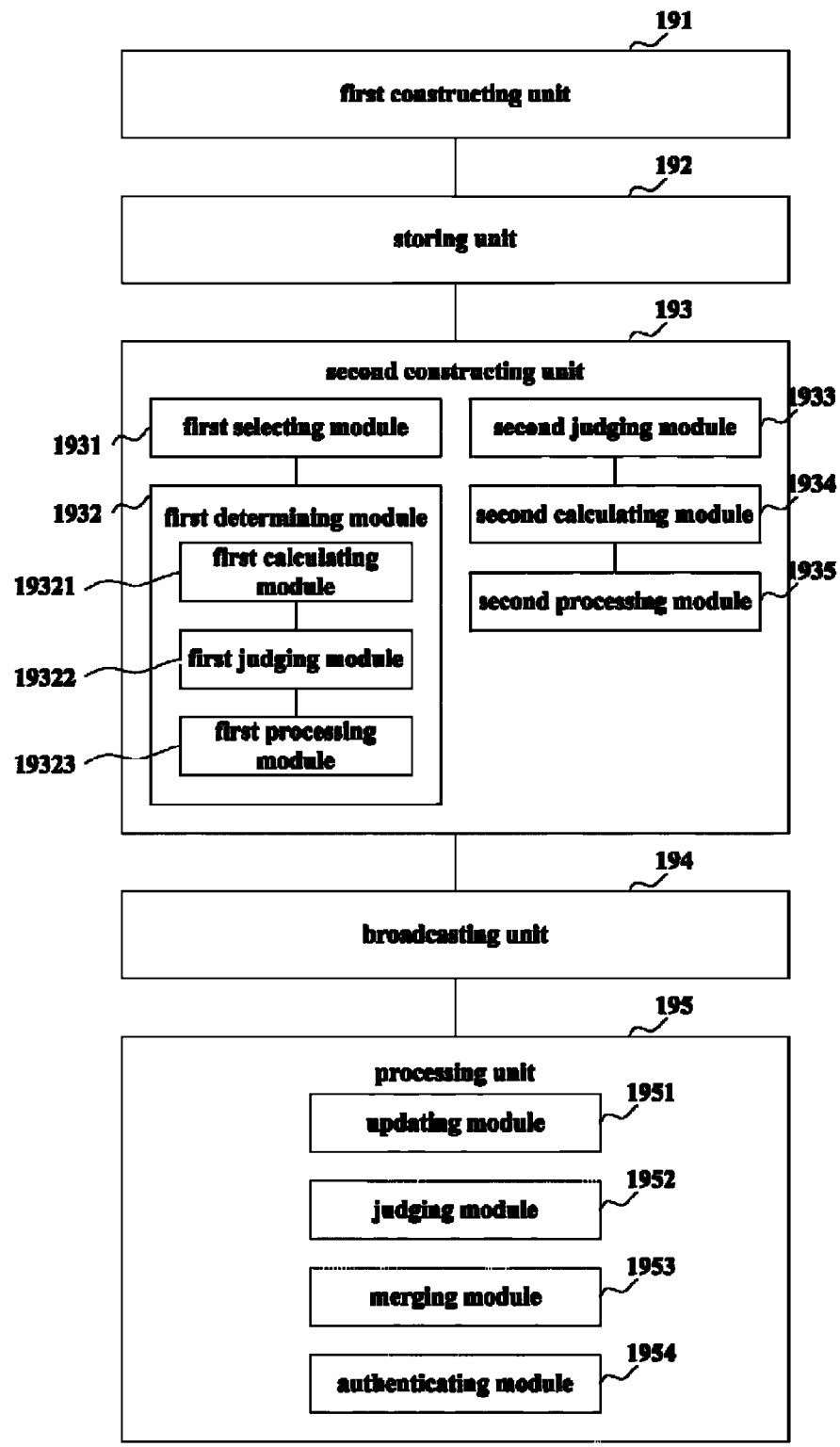
FIG. 19 is a schematic diagram of the structure of a node of an embodiment of the present invention.

An embodiment of the present invention provides a node. FIG. 19 is a schematic diagram of the structure of the node. Referring to FIG. 19, the node includes: a first constructing unit 191, a storing unit 192, a second constructing unit 193 and a broadcasting unit 194; wherein, the first constructing unit 191 is configured to construct a GTS binary tree;

the storing unit 192 is configured to store the GTS binary tree constructed by the first constructing unit and pre-store GTS request information of all neighboring nodes within a collision domain of a local node and reservation history information of the local node; alternatively, the storing unit 192 may also store traffic within a collision domain of a sink node;

the second constructing unit 193 is configured to construct an HELLO packet, the HELLO packet including GTS request information of the local node or including GTS request information of the local node and GTS request information of at least one neighboring node within the collision domain of the local node;

and the broadcasting unit 194 is configured to broadcast the HELLO packet constructed by the second constructing unit, so that a node receiving the HELLO packet performs slot reservation according to information contained in the HELLO packet.

In this embodiment, in constructing the GTS binary tree, the first constructing unit 191 generates a root Root=$(2^0,0)$ of the GTS binary tree according to a formula GTS=$(2^{exp}, \text{offset})$; where, exp=0, and offset=0; generates a left child GTS of each GTS according to a formula $GTS_{left\text{-}child}=(2^{exp+1},\text{offset})$; generates a right child GTS of each GTS according to a formula $GTS_{right\text{-}child}=(2^{exp+1},\text{offset}+2^{exp})$; and constructs the GTS binary tree according to the root of the GTS binary tree, the left child GTS of each GTS and the right child GTS of each GTS.

In this embodiment, GTS request information of the neighboring nodes stored by the storing unit 192 is stored in a record manner, each record corresponding to a neighboring node and including an address of the neighboring node, an address of a next hop of the neighboring node reaching the sink node, a power of a period of a GTS requested by the neighboring node, an offset of the GTS requested by the neighboring node, traffic of the neighboring node, a distance/hop count from the neighboring node to the local node, and confirmation information of the GTS requested by the neighboring node.

In this embodiment, the local reservation history information stored by the storing unit 192 contains a local address, an address of a next hop of the local node reaching the sink node, a power of a period of a GTS requested by the local node, an offset of the GTS requested by the local node, and traffic of the local node. Alternatively, it further contains state of the GTS requested by the local node.

In this embodiment, the second constructing unit 193 includes: a first selecting module 1931 and a first determining module 1932; wherein, the first selecting module 1931 is configured to select a part of records from a local GTS table according to a predetermined policy and take them as the GTS request information of the neighboring node;

and the first determining module 1932 is configured to determine a requested GTS, and take information to which the requested GTS corresponds as the GTS request information.

Wherein, when a maximum hop count of the neighboring nodes within the collision domain of the local node is n, the first selecting module 1931 takes records of all one-hop neighboring nodes within the collision domain of the local node in the local GTS table and records of 2 to n−1-hop neighboring nodes within the collision domain of the local node with confirmation information being agree in the local GTS table as the GTS request information of the neighboring node, or takes records of all 1 to n−1-hop neighboring nodes in the local GTS table as the GTS request information of the neighboring node.

Wherein, the first determining module 1932 includes: a first calculating module 19321, a first judging module 19322 and a first processing module 19323; wherein, the first calculating module 19321 is configured to calculate a period of the requested GTS;

the first judging module 19322 is configured to judge whether the period of the requested GTS varies and/or whether state of the GTS is invalid according to locally saved reservation history information;

and the first processing module 19323 is configured to select GTS and take correlation information of the selected GTS as the requested GTS when the period of the requested GTS varies or the state of the GTS is invalid, and take the correlation information of the requested GTS in the reservation history information as the requested GTS when the period of the requested GTS does not vary and the state of the GTS is valid.

Wherein, the first calculating module 19321 calculates first traffic of the local node, and then calculates a period of the requested GTS according to the following formula by using locally saved total traffic within a collision domain of the sink node and the calculated traffic of the local node:

$$\exp = \text{integer}\left[\log_2\left(\frac{T_{CD-sink}}{T_i}\right)\right] = x;$$

$$\text{where, } x - 1 < \log_2\left(\frac{T_{CD-sink}}{T_i}\right) \leq x,$$

x being an integer, $T_{CD-sink}$ being the total traffic within the collision domain of the sink node, $T_i$ being the traffic of the local node, and $2^{exp}$ being the period of the requested GTS.

Wherein, the first calculating module 19321 obtains the traffic of the local node by traversing each of the records in the local GTS table and adding the traffic to which a record with receiving node being the local node in the records corresponds into the traffic of the local node.

Wherein, in selecting a GTS, corresponding to the calculated period of the requested GTS, the first processing module 19323 searches a locally constructed GTS binary tree according to a predetermined policy, and selects a first idle GTS on the line where the period of the requested GTS is present, or selects a GTS with a GTS offset less than a GTS offset of its receiving node.

Wherein, the predetermined policy is to search the locally constructed GTS binary tree from the left to the right, or to search the locally constructed GTS binary tree from the right to the left.

Wherein, the storing unit 192 further saves total traffic within a collision domain of a sink node, the HELLO packet further includes total traffic within the collision domain of the sink node, and the second constructing unit 193 includes: a second judging module 1933, a second calculating module 1934 and a second processing module 1935; wherein, the second judging module 1933 is configured to judge whether the local node is the sink node;

a second calculating module 1934 is configured to calculate the total traffic amount within the collision domain of the sink node when the local node is the sink node, and add the calculated total traffic of the collision domain of the sink node into the HELLO packet;

and the second processing module 1935 is configured to add the locally saved total traffic within the collision domain of the sink node into the HELLO packet when the local node is not the sink node.

Wherein, the second calculating module 1934 obtains the total traffic within the collision domain of the sink node by traversing each of the records in the local GTS table and adding the traffic to which each record corresponds into the total traffic within the collision domain of the sink node.

In this embodiment, the node may further include:

a processing unit 195, which may include an updating module 1951, and/or a judging module 1952, and/or a merging module 1953, and/or an authenticating module 1954; wherein the updating module 1951 updates total traffic within the collision domain of the sink node according to a received HELLO packet, the judging module 1952 determines a authenticating result of the locally requested GTS made by a sender of the HELLO packet, the merging module 1953 merges a GTS list in the HELLO packet with a local GTS list, and the authenticating module 1954 authenticates a GTS requested by the sender of the HELLO packet;

wherein, the updating module 1951 updates the locally saved traffic within the collision domain of the sink node when the total traffic within the collision domain of the sink node in the HELLO packet is greater than the locally saved total traffic within the collision domain of the sink node; otherwise, keeps the locally saved traffic within the collision domain of the sink node unchanged, and/or wherein, the judging module 1952 scans each record in the GTS list of the HELLO packet to find a record with an address of a transmission node being the address of the local node, and determines that the locally requested GTS as being invalid when confirmation information of the record is denial, and determines that the locally requested GTS as being valid when the confirmation information of the record is agree;

wherein, the merging module 1953 combines a record in the GTS list of the HELLO packet with confirmation information being agree into the local GTS table; wherein, if the record with confirmation information being agree has been saved in the local GTS table, the processing unit replaces a corresponding record in the local GTS table with the record in the HELLO packet when a distance of the record is less than a distance of the corresponding record in the local GTS table, and adds 1 to the distance of the record; and wherein if the record with confirmation information being agree has not been saved in the local GTS table, the processing unit adds the record into the local GTS table, and adds 1 to the distance of the record;

wherein, the authenticating module 1954 performs local receiving inference detection, so as to determine whether the GTS requested by the sender of the HELLO packet collides with the GTS requested by a neighboring node which takes the local node as a receiving node, and performs local transmission inference detection, so as to determine whether the GTS requested by the sender of the HELLO packet collides with the locally requested GTS; in case of no collision, grants agree to the GTS requested by the sender of the HELLO packet; and in case of collision, grants agree to the GTS requested by the sender of the HELLO packet when an address of the sender of the HELLO packet is greater than an address of the neighboring node or an address of the sender of the HELLO packet is greater than an address of the local node; otherwise, grants denial to the GTS requested by the sender of the HELLO packet.

With the apparatus provided by the embodiment of the present invention, calculation complexity of slot assignment is lowered, and utilization of slots is improved.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention include other implementations, wherein the functions may be executed in manners different from those shown or discussed, including executing the functions according to the related functions in a substantially simultaneous manner or in a reverse order, which should be understood by those skilled in the art to which the present invention pertains.

For the implementation of the present invention containing the above embodiments, following supplements are further disclosed.

Supplement 1. A method for assigning slot, including:

constructing an HELLO packet, the HELLO packet including GTS request information of a local node or including GTS request information of the local node and GTS request information of at least one neighboring node within a collision domain of the local node; and broadcasting the HELLO packet, so that a node receiving the HELLO packet performs slot reservation according to information contained in the HELLO packet.

Supplement 2. The method according to supplement 1, wherein the step of constructing an HELLO packet includes:

selecting a part of records from a local GTS table according to a predetermined policy and taking them as the GTS request information of the neighboring node; and determining a requested GTS, and taking information to which the requested GTS corresponds as the GTS request information.

Supplement 3. The method according to supplement 2, wherein if a maximum hop count of neighboring nodes within the collision domain of the local node is n, the step of selecting a part of records from a local GTS table according to a predetermined policy and taking them as the GTS request information of the neighboring node includes:

taking records of all one-hop neighboring nodes within the collision domain of the local node in the local GTS table and records of 2 to n−1-hop neighboring nodes within the collision domain of the local node with confirmation information being agree in the local GTS table as the GTS request information of the neighboring node; or taking records of all 1 to n−1-hop neighboring nodes in the local GTS table as the GTS request information of the neighboring node.

Supplement 4. The method according to supplement 2, wherein the step of determining a requested GTS includes:

calculating a period of the requested GTS;

judging whether the period of the requested GTS varies and/or whether state of the GTS is invalid according to locally saved reservation history information;

selecting a GTS and taking correlation information of the selected GTS as the requested GTS if the period of the requested GTS varies or the state of the GTS is invalid; and taking correlation information of the requested GTS in the reservation history information as the requested GTS if the period of the requested GTS does not vary and the state of the GTS is valid.

Supplement 5. The method according to supplement 4, wherein the step of calculating a period of the requested GTS includes:

calculating traffic of the local node; and calculating the period of the requested GTS according to the following formula by using a locally saved total traffic within a collision domain of a sink node and the calculated traffic of the local node:

$$\exp = \text{integer}\left[\log_2\left(\frac{T_{CD-sink}}{T_i}\right)\right] = x;$$

$$\text{where, } x - 1 < \log_2\left(\frac{T_{CD-sink}}{T_i}\right) \le x,$$

x being an integer, $T_{CD-sink}$ being the total traffic within the collision domain of the sink node, $T_i$ being the traffic of the local node, and $2^{exp}$ being the period of the requested GTS.

Supplement 6. The method according to supplement 5, wherein the step of calculating the traffic of the local node includes:

traversing each of the records in the local GTS table; and adding the traffic to which a record with receiving node being the local node in the records corresponds into the traffic of the local node, so as to obtain the traffic of the local node.

Supplement 7. The method according to supplement 4, wherein the step of selecting a GTS includes:

searching a locally constructed GTS binary tree according to a predetermined policy, corresponding to the calculated period of the requested GTS, and selecting a first idle GTS on the line where the period of the requested GTS is present, or selecting a GTS with a GTS offset less than a GTS offset of its receiving node.

Supplement 8. The method according to supplement 7, wherein the predetermined policy is to search the locally constructed GTS binary tree from the left to the right, or to search the locally constructed GTS binary tree from the right to the left.

Supplement 9. The method according to supplement 1, wherein the HELLO packet further includes total traffic within a collision domain of a sink node, and the step of constructing an HELLO packet further includes:

judging whether the local node is the sink node;

calculating the total traffic within the collision domain of the sink node if the local node is the sink node, and adding the calculated total traffic within the collision domain of the sink node into the HELLO packet; and adding the locally saved total traffic within the collision domain of the sink node into the HELLO packet if the local node is not the sink node.

Supplement 10. The method according to supplement 9, wherein the step of calculating the total traffic within the collision domain of the sink node includes:

traversing each of the records in the local GTS table; and adding the traffic to which each of the records corresponds into the total traffic within the collision domain of the sink node, so as to obtain the total traffic within the collision domain of the sink node.

Supplement 11. The method according to supplement 1, wherein the method further includes: constructing a GTS binary tree, including:

generating a root Root=$(2^0,0)$ of the GTS binary tree according to a formula GTS=$(2^{exp},\text{offset})$; where, exp=0, and offset=0;

generating a left child GTS of each GTS according to a formula $GTS_{left\text{-}child}=(2^{exp+1},\text{offset})$;

generating a right child GTS of each GTS according to a formula $GTS_{right\text{-}child}=(2^{exp+1},\text{offset}+2^{exp})$; and constructing the GTS binary tree by the root of the GTS binary tree, the left child GTS of each GTS and the right child GTS of each GTS.

Supplement 12. The method according to supplement 1, wherein the method further includes:

updating total traffic within a collision domain of a sink node according to a received HELLO packet; and/or determining an authentication result given by a sender of the HELLO packet to the locally requested GTS; and/or merging a GTS list in the HELLO packet with a local GTS table; and/or authenticating a GTS requested by the sender of the HELLO packet.

Supplement 13. The method according to supplement 12, wherein the step of updating the total traffic within a collision domain of a sink node includes:

updating the locally saved total traffic within the collision domain of the sink node if the total traffic within the collision domain of the sink node in the HELLO packet is greater than the locally saved total traffic within the collision domain of the sink node; otherwise, keeping the locally saved traffic within the collision domain of the sink node unchanged.

Supplement 14. The method according to supplement 12, wherein the step of determining an authentication result given by a sender of the HELLO packet to the locally requested GTS includes:

scanning each record in the GTS list of the HELLO packet, so as to find a record with an address of a transmission node being the address of the local node;

determining that the locally requested GTS is invalid if the confirmation information of the record is denial; and determining that the locally requested GTS is valid if the confirmation information of the record is agree.

Supplement 15. The method according to supplement 12, wherein the step of merging the GTS list in the HELLO packet with the local GTS table includes:

merging a record in the GTS list of the HELLO packet with confirmation information being agree into the local GTS table;

wherein, if the record with confirmation information being agree has been stored in the local GTS table, when a distance of the record is smaller than a distance of a corresponding record in the local GTS table, the corresponding record in the local GTS table is replaced with the record in the HELLO packet, and 1 is added to the distance of the record;

wherein, if the record with confirmation information being agree has not been stored in the local GTS table, the record is added into the local GTS table, and 1 is added to the distance of the record.

Supplement 16. The method according to supplement 12, wherein the step of authenticating the GTS requested by the sender of the HELLO packet includes:

performing local receiving interference detection, so as to determine whether the GTS requested by the sender of the HELLO packet collides with a GTS requested by a neighboring node taking the local node as a receiving node;

performing local transmission interference detection, so as to determine whether the GTS requested by the sender of the HELLO packet collides with the locally requested GTS;

if they do not collide, granting agree to the GTS requested by the sender of the HELLO packet; and if they collide, granting agree to the GTS requested by the sender of the HELLO packet when an address of the sender of the HELLO packet is larger than an address of the neighboring node, or when an address of the sender of the HELLO packet is larger than an address of the local node; otherwise, granting denial to the GTS requested by the sender of the HELLO packet.

Supplement 17. A node, including:

a first constructing unit configured to construct a GTS binary tree;

a storing unit configured to store the GTS binary tree constructed by the first constructing unit and pre-store GTS request information of all neighboring nodes within a local collision domain of a local node and reservation history information of the local node;

a second constructing unit configured to construct an HELLO packet, the HELLO packet including GTS request information of the local node or including GTS request information of the local node and GTS request information of at least one neighboring node within the collision domain of the local node; and a broadcasting unit configured to broadcast the HELLO packet constructed by the second constructing unit, so that a node receiving the HELLO packet performs slot reservation according to information contained in the HELLO packet.

Supplement 18. The node according to supplement 17, wherein GTS request information of the neighboring nodes is stored in a record manner, each record corresponding to a neighboring node and including an address of the neighboring node, an address of a next hop of the neighboring node reaching a sink node, a power of a period of a GTS requested by the neighboring node, an offset of the GTS requested by the neighboring node, traffic of the neighboring node, a distance/hop count from the neighboring node to the local node, and confirmation information of the GTS requested by the neighboring node.

Supplement 19. The node according to supplement 17, wherein the local reservation history information contains a local address, an address of a next hop of the local node reaching a sink node, a power of a period of a GTS requested by the local node, an offset of the GTS requested by the local node, and traffic of the local node.

Supplement 20. The node according to supplement 19, wherein the local reservation history information further contains state of the GTS requested by the local node.

Supplement 21. The node according to supplement 17, wherein the second constructing unit includes:

a first selecting module configured to select a part of records from a local GTS table according to a predetermined policy and take them as the GTS request information of the neighboring node; and a first determining module configured to determine a requested GTS, and take information to which the requested GTS corresponds as the GTS request information.

Supplement 22. The node according to supplement 21, wherein when a maximum hop count of the neighboring nodes within the collision domain of the local node is n, the first selecting module takes records of all one-hop neighboring nodes within the collision domain of the local node in the local GTS table and records of 2 to n−1-hop neighboring nodes within the collision domain of the local node with confirmation information being agree in the local GTS table as the GTS request information of the neighboring node, or takes records of all 1 to n−1-hop neighboring nodes in the local GTS table as the GTS request information of the neighboring node.

Supplement 23. The node according to supplement 21, wherein the first determining module includes:

a first calculating module configured to calculate a period of the requested GTS;

a first judging module configured to judge whether the period of the requested GTS varies and/or whether state of the GTS is invalid according to locally saved reservation history information; and a first processing module configured to select GTS and take correlation information of the selected GTS as the requested GTS when the period of the requested GTS varies or the state of the GTS is invalid, and take correlation information of the requested GTS in the reservation history information as the requested GTS when the period of the requested GTS does not vary and the state of the GTS is valid.

Supplement 24. The node according to supplement 23, wherein the first calculating module calculates traffic of the local node, and calculates a period of the requested GTS according to the following formula by using locally saved total traffic within a collision domain of a sink node and the calculated traffic of the local node:

$$\exp = \text{integer}\left[\log_2\left(\frac{T_{CD-sink}}{T_i}\right)\right] = x;$$

$$\text{where, } x - 1 < \log_2\left(\frac{T_{CD-sink}}{T_i}\right) \leq x,$$

x being an integer, $T_{CD\text{-}sink}$ being the total traffic within the collision domain of the sink node, $T_i$ being the traffic of the local node, and $2^{exp}$ being the period of the requested GTS.

Supplement 25. The node according to supplement 24, wherein the first calculating module obtains the traffic of the local node by traversing each of the records in the local GTS table and adding the traffic to which a record with receiving node being the local node in the records corresponds into the traffic of the local node.

Supplement 26. The node according to supplement 23, wherein in selecting a GTS, corresponding to the calculated period of the requested GTS, the first processing module searches the locally constructed GTS binary tree according to a predetermined policy, and selects a first idle GTS on the line where the period of the requested GTS is present, or selects a GTS with a GTS offset less than a GTS offset of its receiving node.

Supplement 27. The node according to supplement 26, wherein the predetermined policy is to search the locally constructed GTS binary tree from the left to the right, or to search the locally constructed GTS binary tree from the right to the left.

Supplement 28. The node according to supplement 17, wherein the storing unit further saves total traffic within a collision domain of a sink node, the HELLO packet further includes total traffic within the collision domain of the sink node, and the second constructing unit includes:

a second judging module configured to judge whether the local node is a sink node;

a second calculating module configured to calculate the total traffic within the collision domain of the sink node when the local node is the sink node, and add the obtained total traffic within the collision domain of the sink node into the HELLO packet; and a second processing module configured to add the locally saved total traffic within the collision domain of the sink node into the HELLO packet.

Supplement 29. The node according to supplement 28, wherein the second calculating module obtains the traffic within the collision domain of the sink node by traversing each of the records in the local GTS table and adding the traffic to which each of the records corresponds into the traffic within the collision domain of the sink node Supplement 30. The node according to supplement 17, wherein in constructing the GTS binary tree, the first constructing unit generates the root Root=$(2^0,0)$ of the GTS binary tree according to formula GTS=$(2^{exp},\text{offset})$; where, exp=0, and offset=0; generates a left child GTS of each GTS according to formula $GTS_{left\text{-}child}=(2^{exp+1},\text{offset})$; generates a right child GTS of each GTS according to formula $GTS_{right\text{-}child}=(2^{exp+1},\text{offset}+2^{exp})$; and constructs the GTS binary tree according to the root of the GTS binary tree, the left child GTS of each GTS and the right child GTS of each GTS.

Supplement 31. The node according to supplement 17, wherein the node includes:

a processing unit including an updating module, and/or a judging module, and/or a merging module, and/or an authenticating module; wherein the updating module updates traffic within a collision domain of a sink node according to a received HELLO packet, the judging module determines a authenticating result of the locally requested GTS made by a sender of the HELLO packet, the merging module merges a GTS list in the HELLO packet with a local GTS table, and the authenticating module authenticates a GTS requested by the sender of the HELLO packet.

Supplement 32. The node according to supplement 31, wherein the updating module updates the locally saved traffic within the collision domain of the sink node when the total traffic within the collision domain of the sink node in the HELLO packet is greater than the locally saved total traffic within the collision domain of the sink node; otherwise, keeps the locally saved traffic within the collision domain of the sink node unchanged.

Supplement 33. The node according to supplement 31, wherein the judging module scans each record in the GTS list of the HELLO packet to find a record with an address of a transmission node being the address of the local node, and determines that the locally requested GTS as being invalid when confirmation information of the record is denial, and determines that the locally requested GTS as being valid when the confirmation information of the record is agree.

Supplement 34. The node according to supplement 31, wherein the merging module merges a record in the GTS list of the HELLO packet with confirmation information being agree into the local GTS table; wherein, if the record with the confirmation information being agree has been saved in the local GTS table, the processing unit replaces a corresponding record in the local GTS table with the record in the HELLO packet when a distance of the record is less than a distance of the corresponding record in the local GTS table, and adds 1 to the distance of the record; and wherein if the record with the confirmation information being agree has not been saved in the local GTS table, the processing unit adds the record into the local GTS table, and adds 1 to the distance of the record.

Supplement 35. The node according to supplement 31, wherein the authenticating module performs local receiving inference detection, so as to determine whether the GTS requested by the sender of the HELLO packet collides with the GTS requested by a neighboring node which takes the local node as a receiving node, and performs local transmission inference detection, so as to determine whether the GTS requested by the sender of the HELLO packet collides with the locally requested GTS; in case of no collision, grants agree to the GTS requested by the sender of the HELLO packet; and in case of collision, grants agree to the GTS requested by the sender of the HELLO packet when an address of the sender of the HELLO packet is greater than an address of the neighboring node or an address of the sender of the HELLO packet is greater than an address of the local node; otherwise, grants denial to the GTS requested by the sender of the HELLO packet.

The invention claimed is:

1. A node, comprising:
a memory; and
a processor coupled to the memory and configured to execute processes including:
constructing a Guaranteed Time Slot (GTS) binary tree;
storing the constructed GTS binary tree and pre-storing GTS request information of all neighboring nodes within a collision domain of a local node and reservation history information of the local node;
constructing an HELLO packet, the HELLO packet comprising GTS request information of the local node or comprising GTS request information of the local node and GTS request information of at least one neighboring node within the collision domain of the local node;
broadcasting the constructed HELLO packet, so that a node receiving the HELLO packet performs slot reservation according to information contained in the HELLO packet;
updating total traffic within a collision domain of a sink node according to a received HELLO packet;
determining a authenticating result given by a sender of the HELLO packet to the locally requested GTS;
merging a GTS list in the HELLO packet with a local GTS table; and
authenticating a GTS requested by the sender of the HELLO packet.

2. The node according to claim 1, wherein GTS request information of the neighboring nodes is stored in a record manner, each record corresponding to a neighboring node and including an address of the neighboring node, an address of a next hop of the neighboring node reaching a sink node, a power of a period of a GTS requested by the neighboring node, an offset of the GTS requested by the neighboring node, traffic of the neighboring node, a distance/hop count from the neighboring node to the local node, and confirmation information of the GTS requested by the neighboring node.

3. The node according to claim 1, wherein the local reservation history information contains a local address, an address of a next hop of the local node reaching a sink node, a power of a period of a GTS requested by the local node, an offset of the GTS requested by the local node, and traffic of the local node.

4. The node according to claim 3, wherein the local reservation history information further contains state of the GTS requested by the local node.

5. The node according to claim 1, wherein the processor is further configured to execute processes including:
selecting a part of records from a local GTS table according to a predetermined policy and taking them as the GTS request information of the neighboring node; and
determining a requested GTS, and take information to which the requested GTS corresponds as the GTS request information of the local node.

6. The node according to claim 5, wherein when a maximum hop count of the neighboring nodes within the collision domain of the local node is n, the processor takes records of all one-hop neighboring nodes within the collision domain of the local node in the local GTS table and records of 2 to n−1-hop neighboring nodes within the collision domain of the local node with confirmation information being agree in the local GTS table as the GTS request information of the neighboring node, or takes records of all 1 to n−1-hop neighboring nodes in the local GTS table as the GTS request information of the neighboring node.

7. The node according to claim 5, wherein the processor is further configured to execute processes including:
calculating a period of the requested GTS;
judging whether the period of the requested GTS varies and/or whether state of the requested GTS is invalid according to locally saved reservation history information of the local node; and
selecting another GTS and taking correlation information of the selected GTS as the requested GTS when the period of the requested GTS varies or the state of the requested GTS is invalid, and taking the GTS request information of the local node in the reservation history information as the requested GTS when the period of the requested GTS does not vary and the state of the requested GTS is valid.

8. The node according to claim 7, wherein the processor calculates traffic of the local node, and calculates a period of the requested GTS according to the following formula by using locally saved total traffic within a collision domain of a sink node and the calculated traffic of the local node:

$$\exp = \text{integer}\left[\log_2\left(\frac{T_{CD-sink}}{T_i}\right)\right] = x;$$

$$\text{where, } x - 1 < \log_2\left(\frac{T_{CD-sink}}{T_i}\right) \leq x,$$

x being an integer, $T_{CD-sink}$ being the traffic within the collision domain of the sink node, $T_i$ being the traffic of the local node, and $2^{exp}$ being the period of the requested GTS.

9. The node according to claim 8, wherein the processor obtains the traffic of the local node by traversing each of the records in the local GTS table and adding the traffic to which a record with receiving node being the local node in the records corresponds into the traffic of the local node.

10. The node according to claim 7, wherein in selecting a GTS, corresponding to the calculated period of the requested GTS, processor searches the constructed GTS binary tree according to a predetermined policy, and selects a first idle GTS on the line where the period of the requested GTS is present, or selects a GTS with a GTS offset less than a GTS offset of its receiving node.

11. The node according to claim 10, wherein the predetermined policy is to search the locally constructed GTS binary tree from the left to the right, or to search the locally constructed GTS binary tree from the right to the left.

12. The node according to claim 1, wherein the processor further saves traffic within a collision domain of a sink node, the HELLO packet further comprises total traffic within the collision domain of the sink node, and the processor is further configured to execute processes including:
  judging whether the local node is a sink node;
  obtaining the traffic within the collision domain of the sink node by traversing each of the records in the local GTS table and adding the traffic to which each of the records corresponds into the traffic within the collision domain of the sink node when the local node is the sink node, and adding the calculated traffic within the collision domain of the sink node into the HELLO packet; and
  adding the saved traffic within the collision domain of the sink node into the HELLO packet when the local node is not the sink node.

13. The node according to claim 12, wherein the processor obtains the traffic within the collision domain of the sink node by traversing each of the records in the local GTS table and adding the traffic to which each of the records corresponds into the traffic within the collision domain of the sink node.

14. The node according to claim 1, wherein the processor generates the root Root=$(2^0,0)$ of the GTS binary tree according to formula GTS=$(2^{exp},\text{offset})$; where, exp=0, and offset=0; generates a left child GTS of each GTS according to formula $\text{GTS}_{left\text{-}child}=(2^{exp+1},\text{offset})$; generates a right child GTS of each GTS according to formula $\text{GTS}_{right\text{-}child}=(2^{exp+1},\text{offset}+2^{exp})$; and constructs the GTS binary tree according to the root of the GTS binary tree, the left child GTS of each GTS and the right child GTS of each GTS.

15. The node according to claim 1, wherein the processor updates the locally saved traffic within the collision domain of the sink node when the total traffic within the collision domain of the sink node in the HELLO packet is greater than the locally saved total traffic within the collision domain of the sink node; otherwise, keeps the locally saved traffic within the collision domain of the sink node unchanged.

16. The node according to claim 1, wherein the processor scans each record in the GTS list of the HELLO packet to find a record with an address of a transmission node being the address of the local node, and determines that the locally requested GTS as being invalid when confirmation information of the record is denial, and determines that the locally requested GTS as being valid when the confirmation information of the record is agree.

17. The node according to claim 1, wherein the processor merges a record in the GTS list of the HELLO packet with confirmation information being agree into the local GTS table; wherein, if the record with the confirmation information being agree has been saved in the local GTS table, the processor replaces a corresponding record in the local GTS table with the record in the HELLO packet when a distance of the record is less than a distance of the corresponding record in the local GTS table, and adds 1 to the distance of the record; and wherein if the record with the confirmation information being agree has not been saved in the local GTS table, the processor adds the record into the local GTS table, and adds 1 to the distance of the record.

18. The node according to claim 1, wherein the processor performs local receiving inference detection, so as to determine whether the GTS requested by the sender of the HELLO packet collides with the GTS requested by a neighboring node which takes the local node as a receiving node, and performs local transmission inference detection, so as to determine whether the GTS requested by the sender of the HELLO packet collides with the locally requested GTS; in case of no collision, grants agree to the GTS requested by the sender of the HELLO packet; and in case of collision, grants agree to the GTS requested by the sender of the HELLO packet when an address of the sender of the HELLO packet is greater than an address of the neighboring node or an address of the sender of the HELLO packet is greater than an address of the local node; otherwise, grants denial to the GTS requested by the sender of the HELLO packet.

19. A slot assignment method, comprising:
  constructing an HELLO packet, the HELLO packet comprising GTS (Guaranteed Time Slot) request information of a local node or comprising GTS request information of the local node and GTS request information of at least one neighboring node within a collision domain of the local node;
  broadcasting the HELLO packet, so that a node receiving the HELLO packet performs slot reservation according to information contained in the HELLO packet;
  updating total traffic within a collision domain of a sink node according to a received HELLO packet;
  determining a authenticating result given by a sender of the HELLO packet to the locally requested GTS;
  merging a GTS list in the HELLO packet with a local GTS table; and
  authenticating a GTS requested by the sender of the HELLO packet.

* * * * *